US012097615B2

(12) United States Patent
Nishina

(10) Patent No.: US 12,097,615 B2
(45) Date of Patent: Sep. 24, 2024

(54) INFORMATION PROCESSING DEVICE AND INFORMATION PROCESSING METHOD

(71) Applicant: OMRON Corporation, Kyoto (JP)

(72) Inventor: Yuki Nishina, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 345 days.

(21) Appl. No.: 17/631,253

(22) PCT Filed: Aug. 15, 2019

(86) PCT No.: PCT/JP2019/032049
§ 371 (c)(1),
(2) Date: Jan. 28, 2022

(87) PCT Pub. No.: WO2021/029064
PCT Pub. Date: Feb. 18, 2021

(65) Prior Publication Data
US 2022/0297292 A1 Sep. 22, 2022

(51) Int. Cl.
*B25J 13/08* (2006.01)
*B25J 9/16* (2006.01)
(Continued)

(52) U.S. Cl.
CPC ........... *B25J 9/1612* (2013.01); *B25J 9/1666* (2013.01); *B25J 9/1697* (2013.01); *B25J 13/089* (2013.01);
(Continued)

(58) Field of Classification Search
CPC ...... B25J 9/1612; B25J 9/1666; B25J 9/1697; B25J 13/089; B25J 15/086; B25J 19/023;
(Continued)

(56) References Cited

U.S. PATENT DOCUMENTS 5,513,299 A * 4/1996 Terasaki ................. B25J 9/1661
700/255
7,313,464 B1 12/2007 Perreault
(Continued)

FOREIGN PATENT DOCUMENTS

CN 109658388 A 4/2019
CN 109773777 A 5/2019
(Continued)

OTHER PUBLICATIONS

Extended European Search Report issued in EP Appln. No. 19941265.1 mailed Mar. 9, 2023.
(Continued)

*Primary Examiner* — B M M Hannan
*Assistant Examiner* — Heather J Keniry
(74) *Attorney, Agent, or Firm* — ROSSI, KIMMS & McDOWELL LLP

(57) ABSTRACT

An information processor calculates, for a robot hand including a plurality of fingers, a gripping pose at which the robot hand grips a target object. The information processor includes a candidate single-finger placement position detector that detects, based on three-dimensional measurement data obtained through three-dimensional measurement of the target object and hand shape data about a shape of the robot hand, candidate placement positions for each of the plurality of fingers of the robot hand, a multi-finger combination searcher that searches for, among the candidate placement positions for each of the plurality of fingers, a combination of candidate placement positions to allow gripping of the target object, and a gripping pose calculator that calculates, based on the combination of candidate placement positions for each of the plurality of fingers, a gripping pose at which the robot hand grips the target object.

8 Claims, 23 Drawing Sheets

(51) Int. Cl.
*B25J 15/08* (2006.01)
*B25J 15/10* (2006.01)
*B25J 19/02* (2006.01)
*G06T 7/13* (2017.01)

(52) U.S. Cl.
CPC ........... *B25J 15/086* (2013.01); *B25J 19/023* (2013.01); *G06T 7/13* (2017.01)

(58) Field of Classification Search
CPC .. B25J 15/10; G06T 7/13; G05B 2219/39476; G05B 2219/39481; G05B 2219/39487; G05B 2219/39542; G05B 2219/39543; G05B 2219/40053; G05B 2219/40607
See application file for complete search history.

(56) References Cited

U.S. PATENT DOCUMENTS

| | | | | |
|---|---|---|---|---|
| 2013/0184860 | A1* | 7/2013 | Ota | B25J 9/1612 700/245 |
| 2013/0211593 | A1 | 8/2013 | Domae | |
| 2013/0238124 | A1 | 9/2013 | Suzuki | |
| 2014/0214202 | A1* | 7/2014 | Nammoto | B25J 9/1653 700/245 |
| 2015/0127162 | A1 | 5/2015 | Gotou | |
| 2017/0008172 | A1 | 1/2017 | Cronie | |
| 2018/0290307 | A1 | 10/2018 | Watanabe | |
| 2019/0143507 | A1* | 5/2019 | Nishina | B25J 9/1669 700/245 |
| 2019/0143508 | A1 | 5/2019 | Nishina et al. | |

FOREIGN PATENT DOCUMENTS

| | | |
|---|---|---|
| EP | 3482885 A1 | 5/2019 |
| JP | 2008062376 A | 3/2008 |
| JP | 2013184279 A | 9/2013 |
| JP | 5558585 B2 | 7/2014 |
| JP | 2014138964 A | 7/2014 |
| JP | 2015089589 A | 5/2015 |
| JP | 2019042853 A | 3/2019 |
| JP | 2019089157 A | 6/2019 |
| WO | 2012066819 A1 | 5/2012 |
| WO | 2018092860 A1 | 5/2018 |
| WO | WO-2019031502 A1 * | 2/2019 ............ B25J 13/082 |

OTHER PUBLICATIONS

Office Action issued in Chinese Appln. No. 201980098986.1, mailed Dec. 13, 2023. English translation provided.

International Search Report issued in Intl. Appln. No. PCT/JP2019/032049 mailed Sep. 24, 2019. English translation provided.

Written Opinion issued in Intl. Appln. No. PCT/JP2019/032049 mailed Sep. 24, 2019. English translation provided.

* cited by examiner

FIG. 6
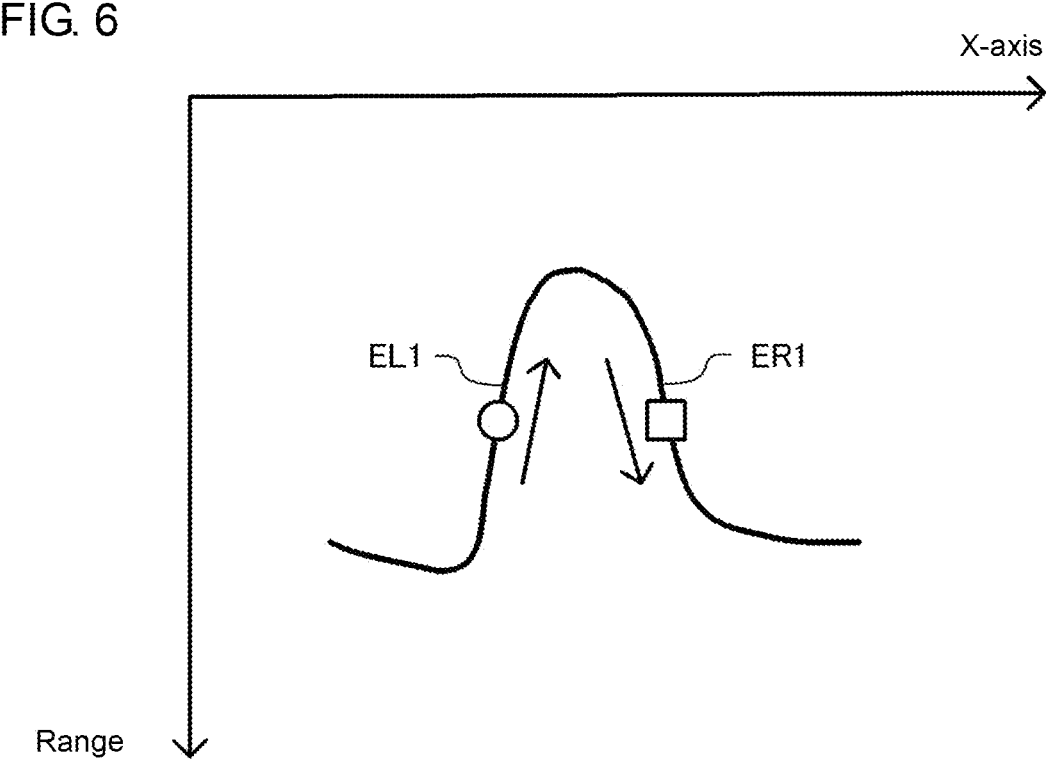
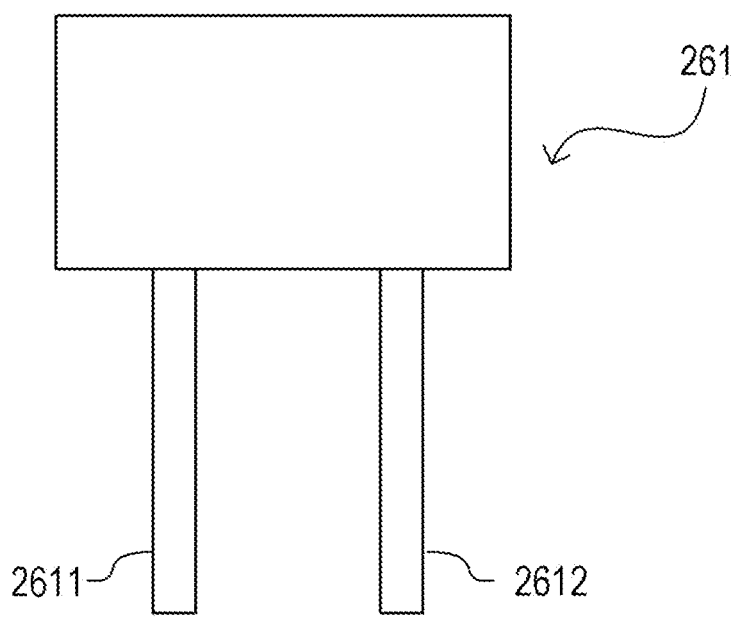

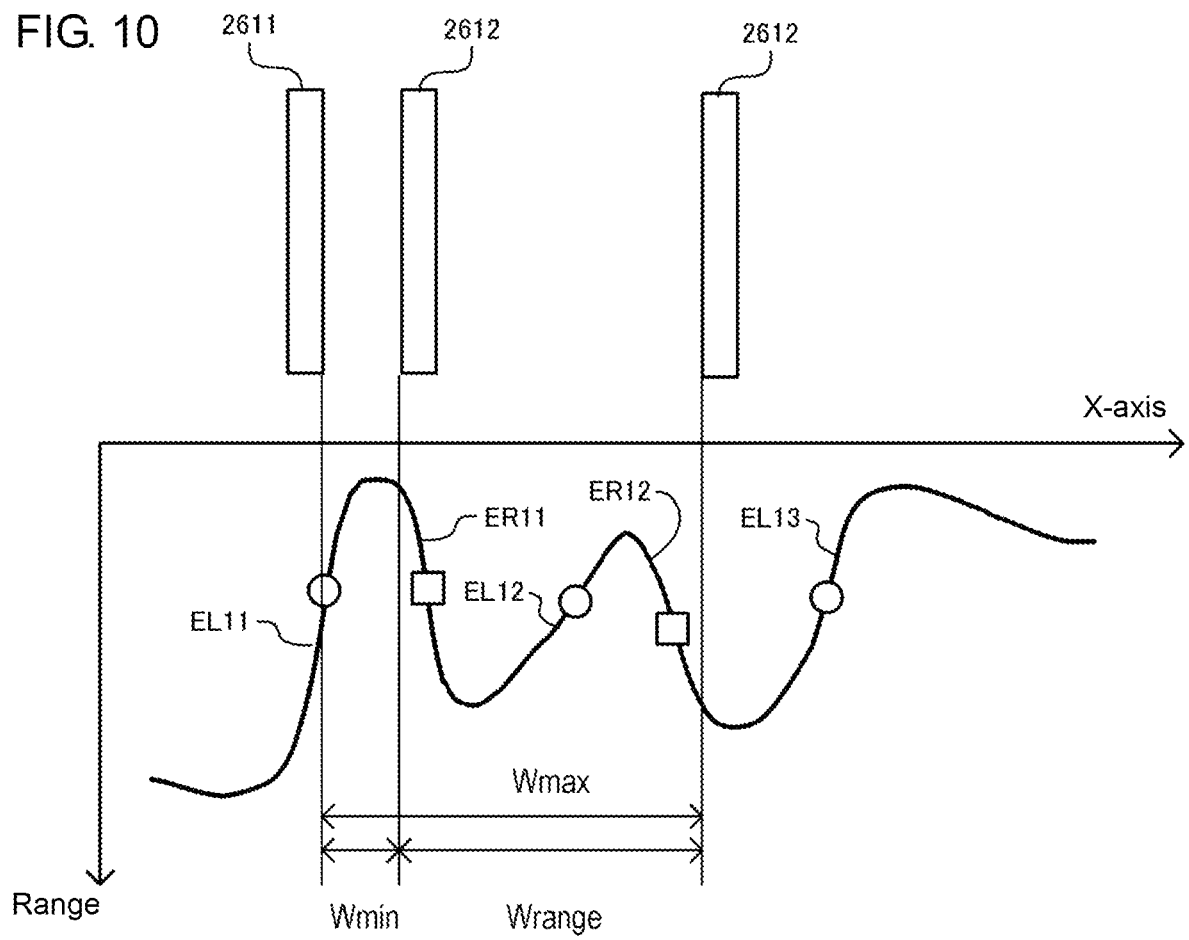

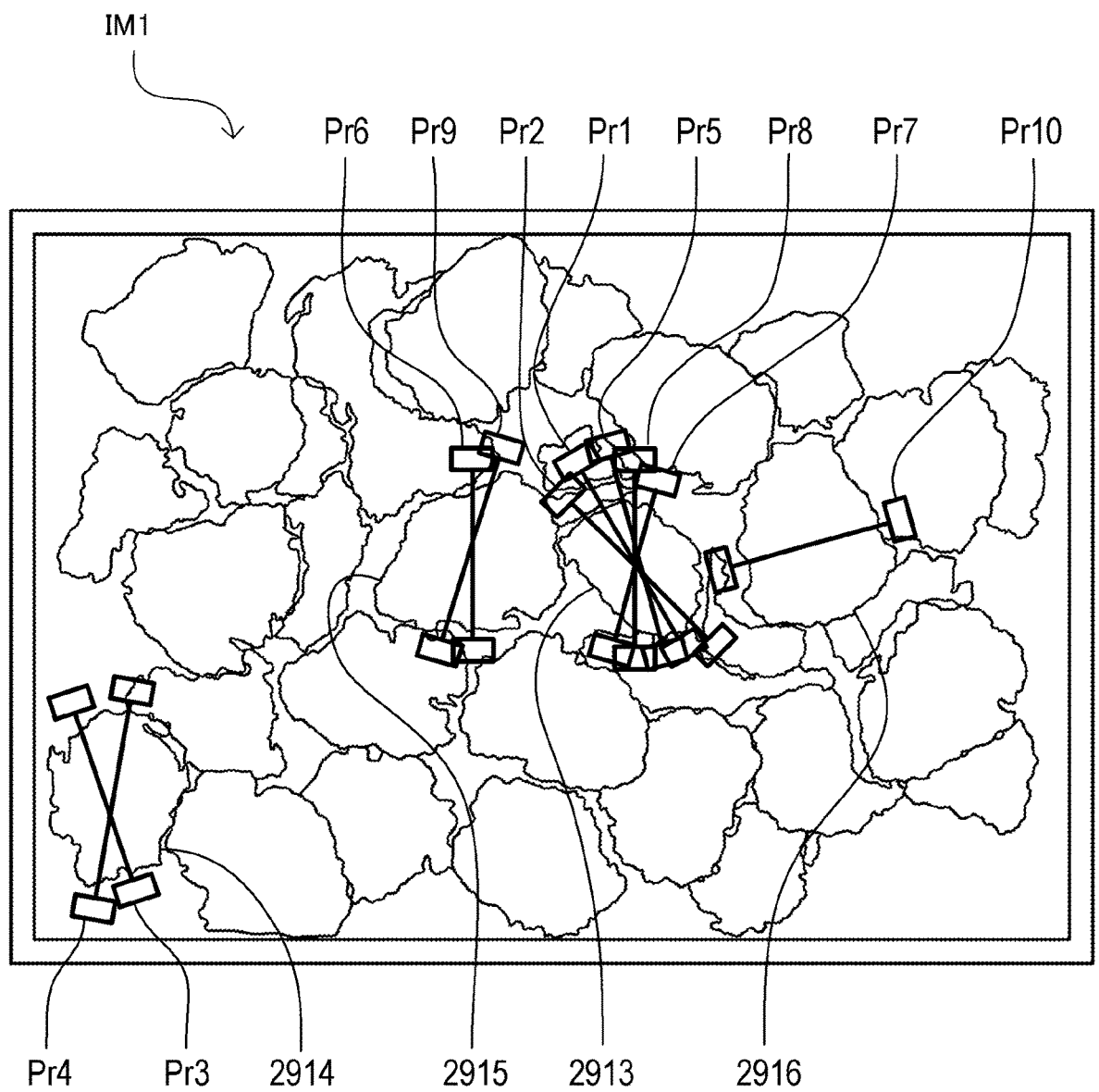

INFORMATION PROCESSING DEVICE AND INFORMATION PROCESSING METHOD

FIELD

The present invention relates to an information processor and an information processing method.

BACKGROUND

For inspection and picking in factory automation (FA), a known method for recognizing (detecting) an object in an image uses a model for the object based on three-dimensional (3D) computer-aided design (CAD) data to recognize the pose of the object and then estimates a gripping position for a robot hand. For a rigid object with a definite shape such as a bolt or a nut, a model for the object based on 3D CAD data is used to recognize the pose of each of the objects randomly placed in a container and estimate a gripping position for a robot hand.

Another technique called model-less gripping position recognition uses, instead of a model for an object, 3D measurement data for an object and the shape of a robot hand to recognize a position on the object for gripping. The technique is usable for rigid objects such as bolts or nuts, as well as for any objects for which a model based on 3D CAD data cannot be used. Such objects include non-rigid objects such as flexible cables and objects with an indefinite shape such as packaging for liquid detergents.

For example, the technique described in Patent Literature 1 uses a range image and a two-dimensional (2D) hand model to calculate a gripping pose that allows a segment extracted from the range image to be within the opening width of the hand and allows no collision with any surrounding segments.

When a gripping pose with multiple opening widths is calculated using a 2D hand model for a multi-finger hand, a 2D hand model is created for each opening width. The gripping pose is then recognized multiple times with each model. The time taken for calculation increases in proportion to the number of the opening widths. The processing time thus increases. When a gripping pose for gripping target objects with different orientations and shapes is searched for with one opening width, the largest possible opening width is to be set for the hand to grip all the target objects. The largest possible opening width may be set for a target object surrounded by no obstacles. However, a collision may occur with another object near a gripping target in, for example, picking randomly placed objects, thus limiting the number of obtainable candidate gripping poses.

CITATION LIST

Patent Literature

Patent Literature 1: Japanese Patent No. 5558585

SUMMARY

Technical Problem

In response to the above issue, one or more aspects of the present invention are directed to a technique for model-less calculation of a gripping pose at high speed.

Solution To Problem

An information processor according to an aspect of the present invention is an information processor for calculating, for a robot hand including a plurality of fingers, a gripping pose at which the robot hand grips a target object. The information processor includes a candidate single-finger placement position detector that detects, based on three-dimensional measurement data obtained through three-dimensional measurement of the target object and hand shape data about a shape of the robot hand, candidate placement positions for each of the plurality of fingers of the robot hand, a multi-finger combination searcher that searches for, among the candidate placement positions for each of the plurality of fingers, a combination of candidate placement positions to allow gripping of the target object, and a gripping pose calculator that calculates, based on the combination of candidate placement positions for each of the plurality of fingers, a gripping pose at which the robot hand grips the target object.

The information processor according to the above aspect of the present invention causes the candidate single-finger placement position detector to detect, based on 3D measurement data obtained through 3D measurement of a target object and hand shape data about the shape of a robot hand including a plurality of fingers, a candidate placement position for each of the fingers of the robot hand for calculating a gripping pose at which the robot hand grips the target object. Among the candidate placement positions detected in this manner for the fingers, the multi-finger combination searcher then searches for combinations of placement positions that satisfy criteria including a criterion about the positional relationship between the fingers of the robot hand and allow gripping of the target object. Based on the combinations searched for the fingers in this manner, the gripping pose calculator calculates a gripping pose based on the order of priority and other information. This eliminates repeated calculation of gripping poses for each of multiple hand shape models with different opening widths. For any number or any arrangement of fingers of a multi-finger hand, this structure allows model-less calculation of the gripping pose at high speed by detecting candidate placement positions for each finger and searching for combinations of such placement positions.

In the above aspect of the present invention, the candidate single-finger placement position detector may further detect, based on three-dimensional measurement data about the target object obtained at an angle changed relative to the plurality of fingers for which candidate placement positions are to be detected, candidate placement positions for each of the plurality of fingers of the robot hand.

This eliminates changes in the process of detecting a candidate placement position for each finger in accordance with the angles of the fingers relative to a target object. Instead, a candidate placement position for each finger is detected in 3D measurement data with an angle changed relative to the fingers. This allows the process of detecting a candidate placement position for each finger in a uniform manner, thus allowing high-speed calculation of a gripping pose with different angles relative to the target object.

In the above aspect of the present invention, the candidate single-finger placement position detector may detect an edge in a depth direction of a range image represented by the three-dimensional measurement data and detect, based on the detected edge, candidate placement positions for each of the plurality of fingers.

In this manner, a placement position for each finger of the robot hand is detected based on the edge in the depth direction of the range image. A position that the robot hand can easily grip is thus detected as a candidate placement position. Of the edges in the depth direction with respect to the image plane of the range image, any one with a constant intensity may be detected as a candidate placement position for a finger.

In the above aspect of the present invention, the candidate single-finger placement position detector may detect, based on the hand shape data, candidate placement positions for each of the plurality of fingers to avoid collision at a position of the edge.

The robot hand at the calculated gripping pose can thus avoid collision in a reliable manner.

In the above aspect of the present invention, the multi-finger combination searcher may calculate, for the combination of candidate placement positions for each of the plurality fingers, a holdable height indicating an overlap, in the depth direction, between edges corresponding to the candidate placement positions for each of the plurality of fingers, and search for, based on the holdable height, a combination of candidate placement positions for each of the plurality of fingers.

A larger holdable height allows the robot hand to grip the target object accurately. Thus, a combination of candidate placement positions for the fingers of the robot hand is searched for based on the holdable height to allow calculation of a gripping pose that achieves a high success rate for gripping. A threshold may be set for the holdable height, and any combination with a calculated holdable height that exceeds the threshold may be determined as a combination of candidate placement positions for the fingers.

In the above aspect of the present invention, the multi-finger combination searcher may calculate, for the combination of candidate placement positions for each of the plurality fingers, an inner recess height indicating a recess between edges corresponding to the candidate placement positions for each of the plurality of fingers, and search for, based on the inner recess height, a combination of candidate placement positions for each of the plurality of fingers.

When the inner recess height is large, two or more target objects are highly likely to be between the candidate placement positions for the fingers. With a combination of such candidate placement positions, the robot hand is more likely to grip two or more target objects. Thus, a combination of candidate placement positions for the fingers of the robot hand is searched for based on the inner recess height to allow calculation of a gripping pose that achieves a high success rate for gripping. A threshold may be set for the inner recess height, and any combination with a calculated inner recess height less than the threshold may be determined as a combination of candidate placement positions for the fingers.

An information processing method according to another aspect of the present invention is a method for calculating, for a robot hand including a plurality of fingers, a gripping pose at which the robot hand grips a target object. The information processing method includes detecting, based on three-dimensional measurement data obtained through three-dimensional measurement of the target object and hand shape data about a shape of the robot hand, candidate placement positions for each of the plurality of fingers of the robot hand, searching for, among the candidate placement positions for each of the plurality of fingers, a combination of candidate placement positions to allow gripping of the target object, and calculating, based on the combination of candidate placement positions for each of the plurality of fingers, a gripping pose at which the robot hand grips the target object.

The information processing method according to the above aspect of the present invention causes the candidate single-finger placement position detector to detect, based on 3D measurement data obtained through 3D measurement of a target object and hand shape data about the shape of a robot hand including a plurality of fingers, a candidate placement position for each of the fingers of the robot hand for calculating a gripping pose of the robot hand to grip the target object. Among the candidate placement positions detected in this manner for the fingers, combinations of placement positions that satisfy criteria including a criterion about the positional relationship between the fingers of the robot hand and allow gripping of the target object are searched for. Based on the combinations searched for the fingers in this manner, a gripping pose is calculated based on the order of priority and other information. This eliminates repeated calculation of gripping poses for each of multiple hand shape models with different opening widths. For any number or any arrangement of fingers of a multi-finger hand, this structure allows model-less calculation of the gripping pose at high speed by detecting candidate placement positions for each finger and searching for combinations of such placement positions.

The information processing method according to the above aspect of the present invention may also be provided as a program for causing a computer to implement the method or a non-transitory storage medium storing the program.

Advantageous Effects

The technique according to the above aspects of the present invention allows model-less calculation of a gripping pose at high speed.

BRIEF DESCRIPTION OF THE DRAWINGS

FIG. 6 is a schematic diagram describing edge detection.

FIG. 10 is a schematic diagram describing an opening width between a left finger and a right finger.

FIG. 16 is a diagram of a range image showing prioritized candidate multi-finger combinations.

DETAILED DESCRIPTION

Example Use

Example uses of the present invention will now be described with reference to the drawings.

Figure 1:
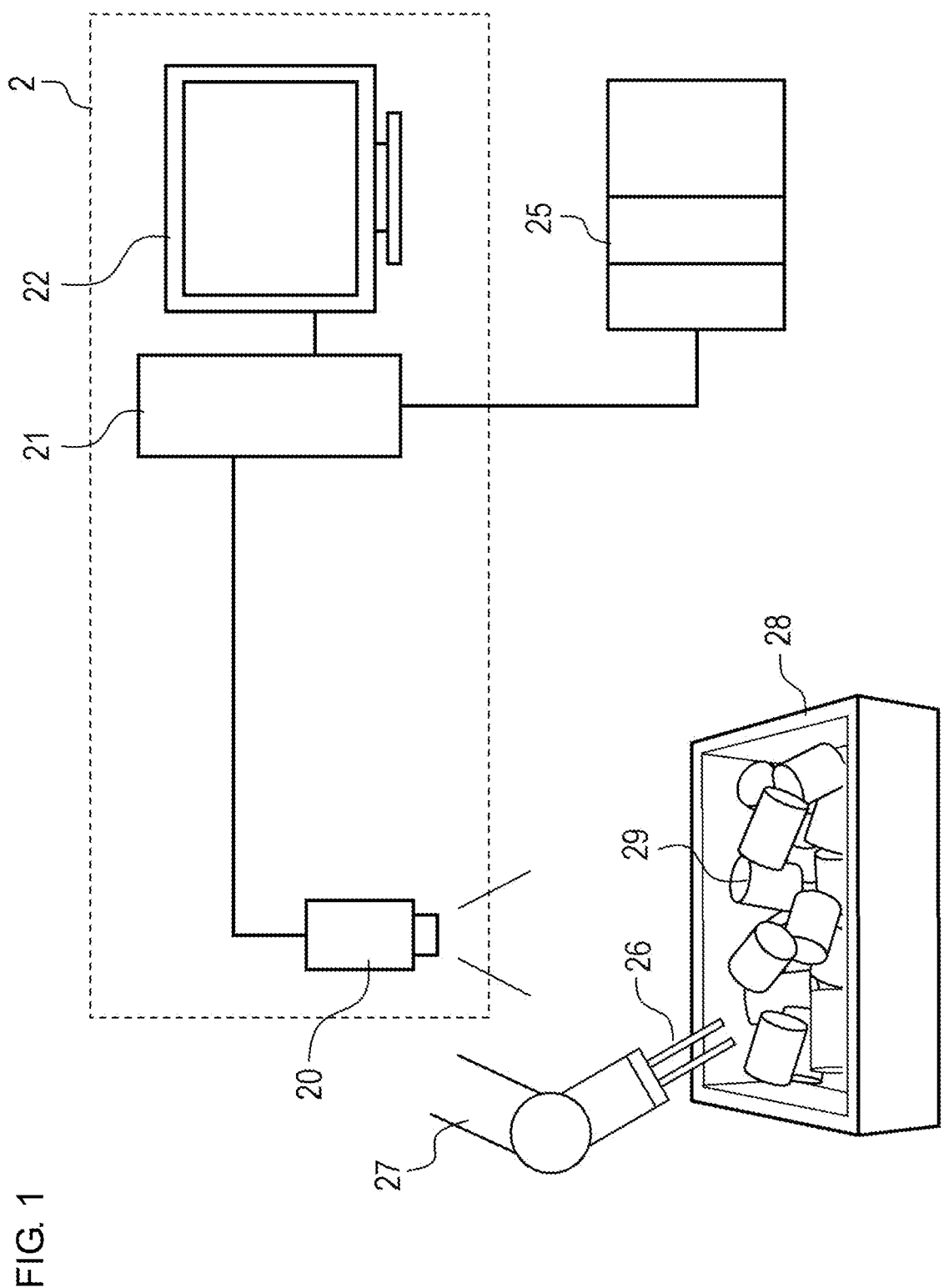
FIG. 1 is a diagram showing an example overall configuration of a gripping position recognition apparatus in a first embodiment.

The present invention is applicable to an information processor 21 included in a gripping position recognition apparatus 2 in FIG. 1 showing its overall configuration. In the gripping position recognition apparatus 2, a sensor unit 20 three-dimensionally measures multiple target objects 29 randomly placed in a tray 28, and the information processor 21 searches for candidate combinations for a multi-finger hand based on a range image being three-dimensional (3D) measurement data about the multiple target objects 29 and hand shape data about a multi-finger hand 26. Candidate combinations for the multi-finger hand determined by rotating the range image are integrated and prioritized using an evaluation index and are output to a programmable logic controller (PLC) 25. The PLC 25 controls a robot 27 based on the order of priority to cause the multi-finger hand 26 to grip a target object 29.

Figure 24A:
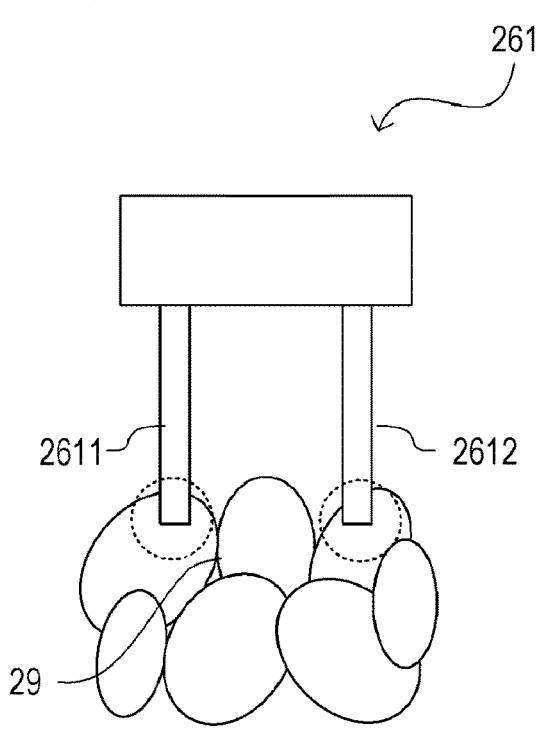
FIG. 24A is a diagram describing an example use of a known technique.

With a known gripping pose calculation method for a multi-finger hand, a gripping pose calculation process may be performed multiple times for two-dimensional (2D) hand models each corresponding to an opening width of each finger. The process is thus time-consuming. When the gripping pose is searched for with one opening width, the largest possible width is set (refer to FIG. 24A). However, in picking randomly placed objects, a target object 29 to be gripped is surrounded by other target objects that may collide with the fingers as indicated by dotted circles in FIG. 24A. Thus, a sufficient number of candidate gripping poses may not be obtained.

Figure 24B:
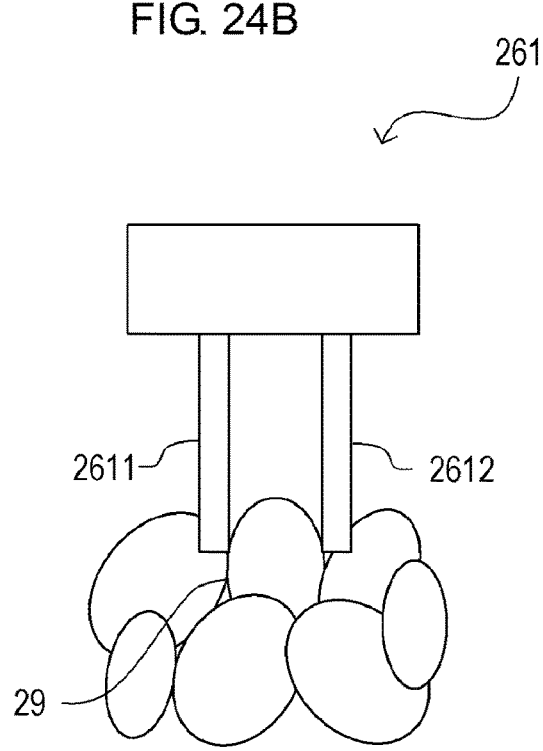
FIG. 24B is a diagram describing an example use of the technique according to the embodiments of the present invention.

The technique according to the embodiments of the present invention detects candidate finger placement positions for each of the multiple fingers and searches for, among the candidate finger placement positions for the fingers, one or more combinations that allow gripping the target. This allows finger placement position detection or combination searches with multiple finger opening widths (refer to FIG. 24B). This eliminates repeated processing with multiple pieces of hand shape data corresponding to the opening widths and shortens the time for gripping pose calculation, thus allowing faster calculation.

Examples of the multi-finger hand include a two-finger hand and a three-finger hand. A multi-finger hand may have a different number of fingers. A hand is also referred to as a gripper or an end effector.

First Embodiment

Overall Configuration of Gripping Position Recognition Apparatus

The gripping position recognition apparatus 2 including the information processor 21 according to a first embodiment of the present invention will now be described with reference to FIG. 1.

The gripping position recognition apparatus 2 is installed on a production line for, for example, product assembly or processing. The gripping position recognition apparatus 2 recognizes, based on data received from the sensor unit 20 and data about the shape of the multi-finger hand 26, the gripping pose of the robot 27 with respect to a target object 29 placed in the tray 28. Recognition target objects (hereafter also referred to as target objects) 29 are randomly placed in the tray 28.

The gripping position recognition apparatus 2 mainly includes the sensor unit 20 and the information processor 21. The sensor unit 20 and the information processor 21 are connected to each other with wires or wirelessly. The information processor 21 receives an output from the sensor unit 20. The information processor 21 performs various processes using data received from the sensor unit 20. Examples of the processes performed by the information processor 21 include distance measurement (ranging), 3D shape recognition, object recognition, and scene recognition. The recognition result from the gripping position recognition apparatus 2 is output to, for example, the PLC 25 or a display 22, and is used for controlling the robot 27, for example.

Sensor Unit

The sensor unit 20 includes at least a camera for capturing optical images of target objects 29. The sensor unit 20 may further include any component (e.g., a sensor, an illuminator, and a projector) to be used for 3D measurement of the target objects 29. For measuring the depth using stereo matching (also referred to as stereo vision or a stereo camera system), for example, the sensor unit 20 includes multiple cameras. For active stereo that projects a random dot pattern onto the target object 29, the sensor unit 20 further includes a projector for projecting structured light onto the target objects 29. For 3D measurement using pattern projection with space encoding, the sensor unit 20 includes a projector for projecting patterned light and cameras. Another method may be used to generate 3D information about the target objects 29, such as photometric stereo, a time-of-flight (TOF) method, or phase shifting.

Information Processor

The information processor 21 is, for example, a computer including a central processing unit (CPU), a random-access memory (RAM), a nonvolatile storage (e.g., a hard disk drive, or a solid-state drive or SSD), an input device, and an output device. In this case, the CPU loads the program stored in the nonvolatile storage into the RAM and executes the program to implement various components described later. The information processor 21 may have another configuration. The components may be entirely or partly implemented by a dedicated circuit such as a field-programmable gate array (FPGA) or an application-specific integrated circuit (ASIC), or by cloud computing or distributed computing.

Figure 2:
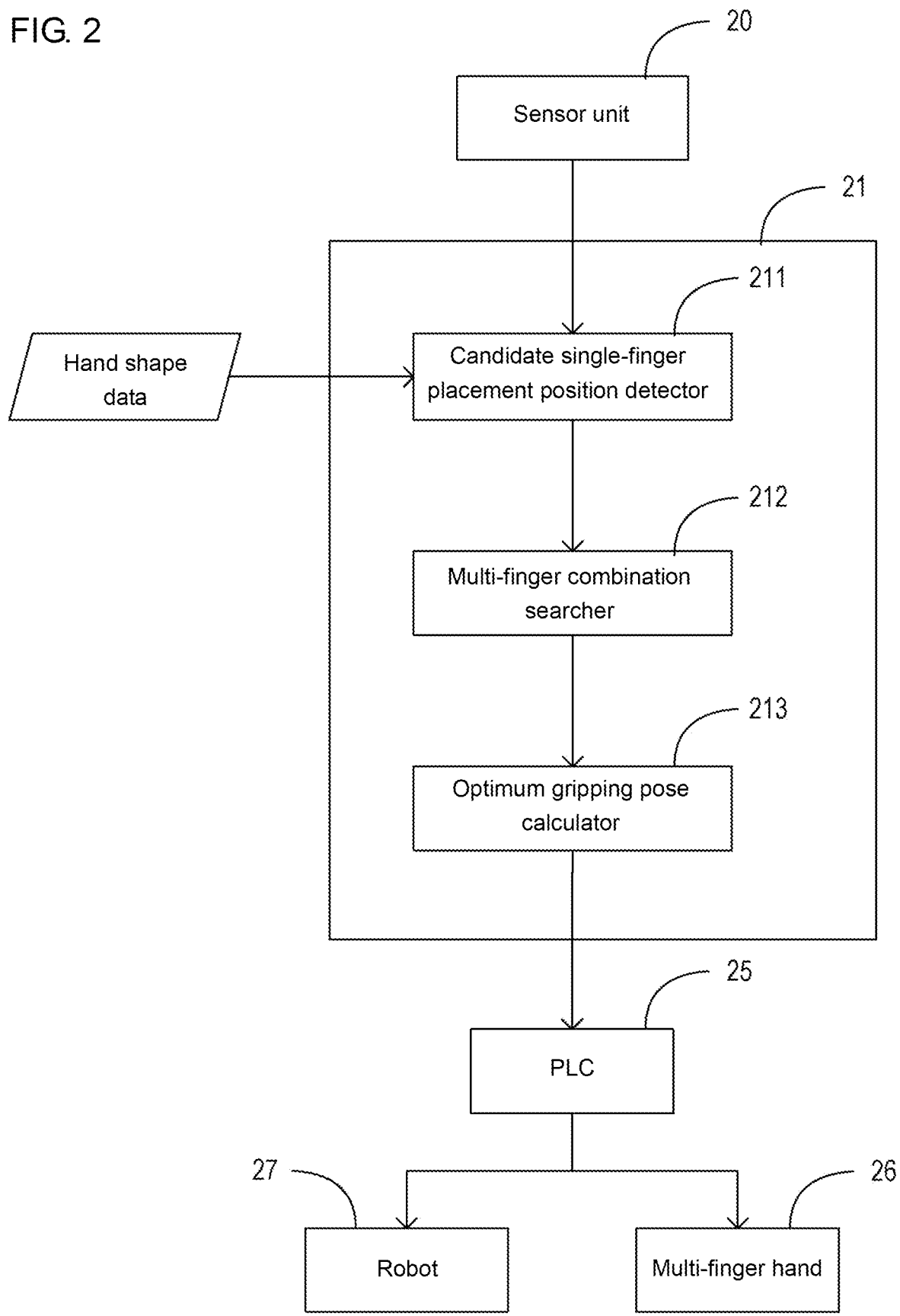
FIG. 2 is a functional block diagram of an information processor according to the first embodiment.

FIG. 2 is a block diagram of the information processor 21. The information processor 21 mainly includes a candidate single-finger placement position detector 211, a multi-finger combination searcher 212, and an optimum gripping pose calculator 213. The candidate single-finger placement position detector 211 obtains 3D measurement data about a target object from the sensor unit 20 and hand shape data and detects one or more finger placement positions for each finger of the multi-finger hand 26. The multi-finger combination searcher 212 searches for, among candidate finger placement positions for each finger detected by the candidate single-finger placement position detector 211, one or more combinations of the positions for the fingers of the multi-finger hand 26. The optimum gripping pose calculator 213 calculates an optimum gripping pose for the multi-finger hand 26 and the robot 27. Information about the optimum gripping pose for the multi-finger hand 26 and the robot 27 calculated by the optimum gripping pose calculator 213 is output to the PLC 25 and used for controlling the multi-finger hand 26 and the robot 27. The hand shape data may be stored in a predetermined area in a nonvolatile storage in the information processor 21, or in another device.

Gripping Position Recognition Process

Figure 3:
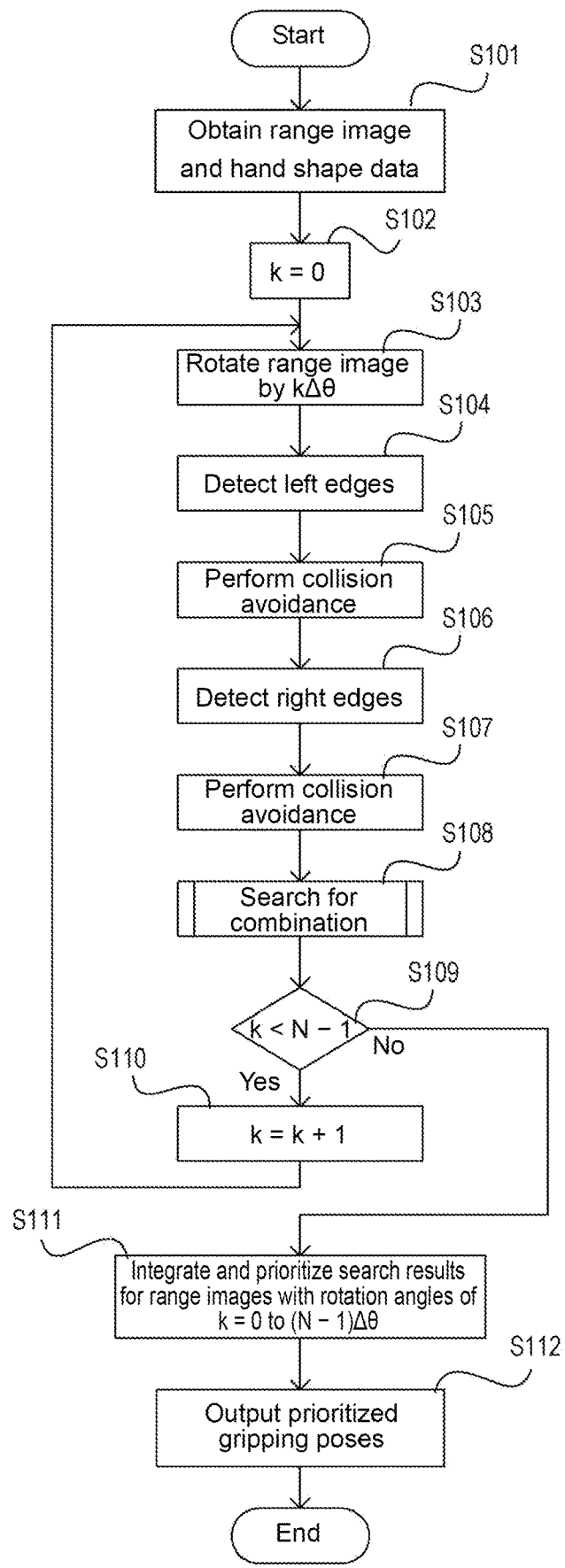
FIG. 3 is a flowchart showing a gripping position recognition process according to the first embodiment.

An example gripping position recognition process performed with the method of information processing performed by the information processor 21 will now be described with reference to the flowchart in FIG. 3.

Figure 4:
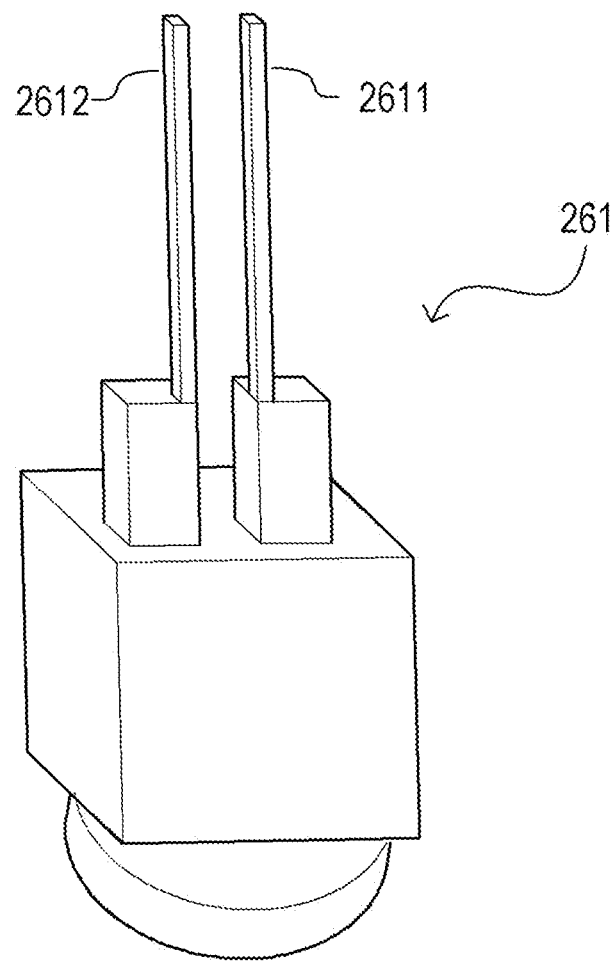
FIG. 4 is a schematic perspective view of a two-finger hand.

In step S101, the candidate single-finger placement position detector 211 obtains, as 3D measurement data about the target objects, a range image with depth values (depth information) associated with respective points (pixels) in a 2D image, and hand shape data. In the present embodiment described below, a two-finger hand 261 including two fingers 2611 and 2612 as shown in FIG. 4 will be used as a multi-finger hand.

In step S102, a coefficient k that defines the rotation angle of the range image (described later) is set to 0, where k is an integer greater than or equal to 0 and less than or equal to N.

In step S103, the candidate single-finger placement position detector 211 rotates the range image obtained in step S101 by the angle kΔθ. When a unit angle Δθ by which the range image rotates is set to a smaller value, the processing is performed more times for the rotated image, thus increasing the processing load. When the unit angle Δθ is set to a larger value, fewer candidates are obtained, possibly disabling detection of an optimum gripping pose. Based on such conditions, the unit angle Δθ is preset or set by the user through an input operation. In the present embodiment, the unit angle Δθ is set to 15 degrees, and the rotation is counterclockwise. Rotating the range image in this manner changes the angle of the multi-finger hand 26 relative to the target object, allowing calculation of the gripping poses at different angles relative to the target object. Moreover, rotating the range image in this manner eliminates the operation of changing the direction for detection of a candidate single-finger placement position in x-direction and y-direction.

Figure 5A:
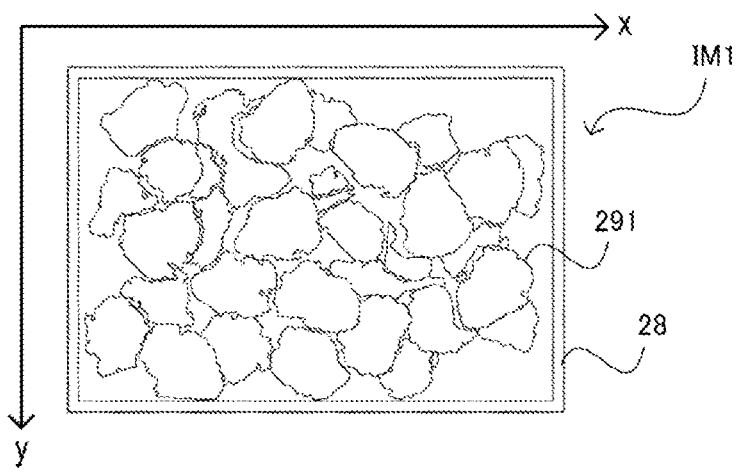
FIGS. 5A, 5B, and 5C each are a diagram of a range image, respectively rotated by 0 degrees, 15 degrees, and 90 degrees.
Figure 5B:
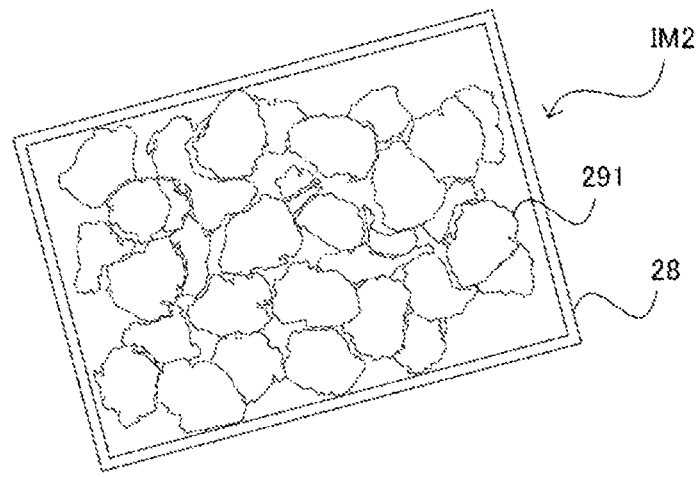
Figure 5C:
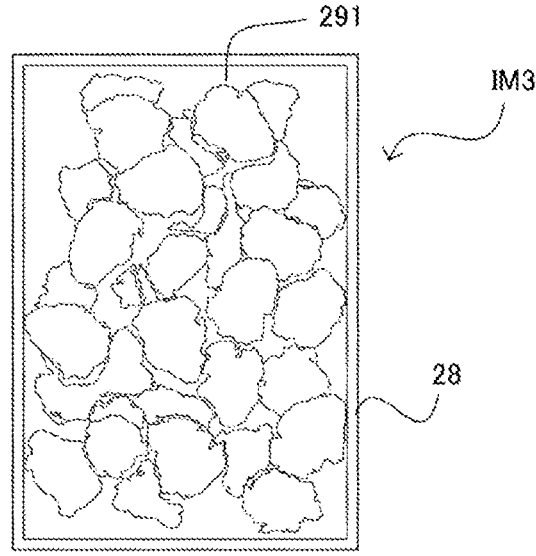

FIGS. 5A to 5C schematically show range images obtained from the sensor unit 20 that three-dimensionally measures deep-fried chicken pieces 291 being target objects 29 randomly placed in the tray 28. FIG. 5A shows a range image IM1 of the target objects 291 with a rotation angle kΔθ of 0 degrees, which corresponds to k=0. FIG. 5B shows a range image IM2 of the target objects 291 with a rotation angle KΔθ of 15 degrees, which corresponds to k=1. FIG. 5C shows a range image IM3 of the target objects 291 with a rotation angle kΔθ of 90 degrees, which corresponds to k=6.

When the unit angle Δθ is set to 15 degrees, 180 degrees divided by 15 degrees equals 12, to which N is set (described later). The value of k is increased from 0 to 12 in increments of 1 to detect single-finger placement positions in range images with rotation angles increased from 0 to 165 degrees in increments of 15 degrees. The two-finger hand 261 in the present embodiment has the two fingers 2611 and 2612 facing each other at an angle of 180 degrees. While facing each other at an angle of 180 degrees, the two fingers 2611 and 2612 move to have the distance between them increased or decreased to grip a target object. Thus, any range image rotated at 180 degrees or more is equivalent to its corresponding range image in which the two fingers 2611 and 2612 are replaced with each other. The processing may be eliminated for such a range image.

In step S104, the candidate single-finger placement position detector 211 detects left edges in the range image of the target objects 29 rotated by the angle kΔθ in step S103. The process for the range image IM1 with a rotation angle of 0 degrees (k=0) will be described as an example. For the range image IM1 in FIG. 5A, x-axis extends parallel to the page of the figure and horizontally rightward, and y-axis extends parallel to the page of the figure and vertically downward. For the range image IM1 in FIG. 5A, the range is in a direction orthogonal to and into the page of the figure. In FIGS. 5B and 5C, x-axis and y-axis each extend in the same direction as in FIG. 5A, although the range image is rotated.

Edge detection will now be described with reference to FIG. 6.

The range image IM1 in FIG. 5A has information about 2D positions in x-direction and y-direction extending parallel to the page of the figure, and information about the range in the direction orthogonal to and into the page of the figure. The upper part of FIG. 6 is a schematic diagram of 3D information about the range image IM1 with x-axis extending horizontally rightward and the range increasing vertically downward.

An edge herein refers to adjoining pixels having a larger difference in the range between them. Edge detection may be performed along x-axis in the range image in FIG. 6 using the known Canny operator or the Sobel operator, or another method. At an edge EL1 (indicated by a circle in the figure), the range decreases along x-axis in the range image in FIG. 6. The edge EL1 may be grippable by the left finger 2611 of the two-finger hand 261 and is thus referred to as a left edge. An edge ER1 (indicated by a square in the figure), at which the range increases, may be grippable by the right finger 2612 of the two-finger hand 261, and is thus referred to as a right edge.

Figure 7:
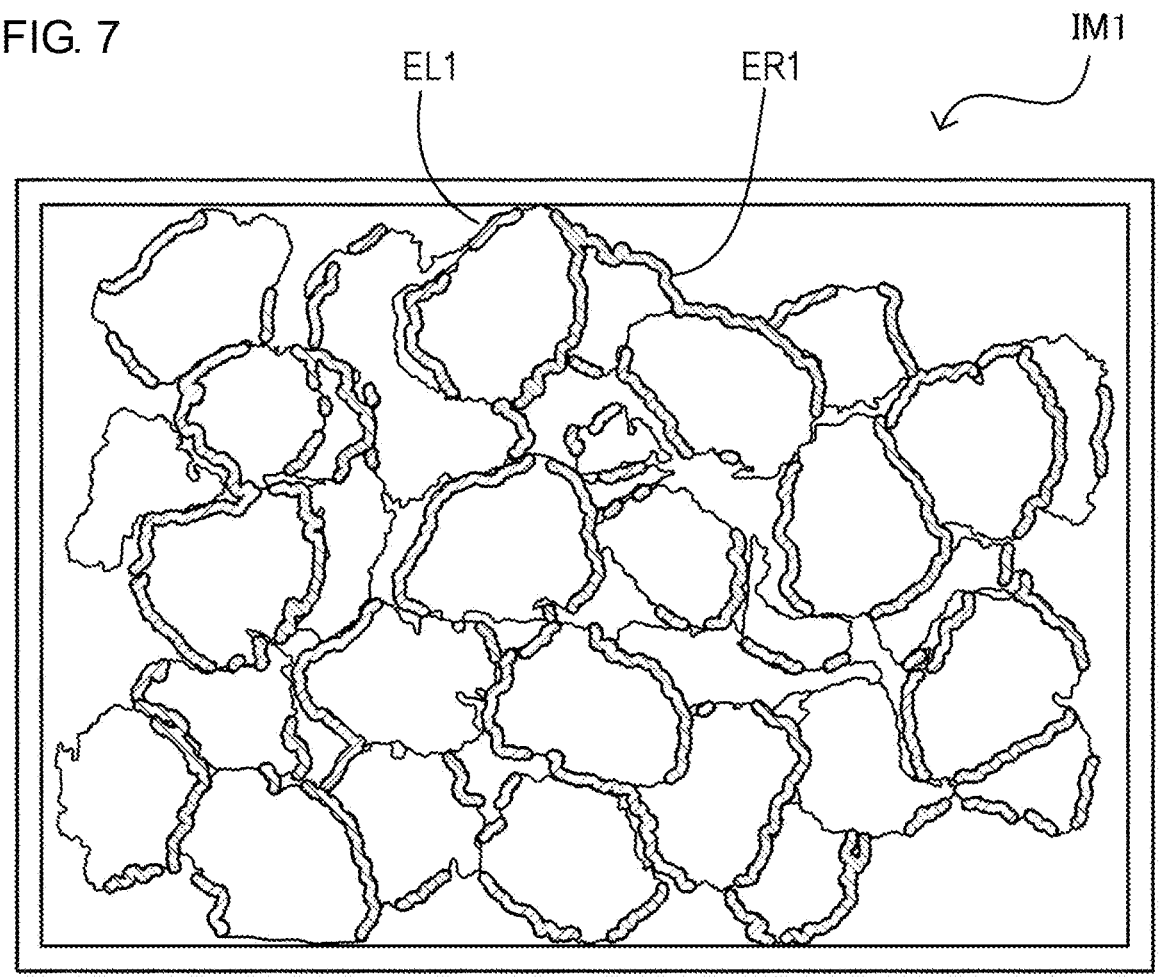
FIG. 7 is a diagram of a range image showing left edges and right edges detected.

FIG. 7 is a diagram of the range image IM1 schematically showing left edges EL1 (hatched with lines sloping upward to the right in the figure) and right edges ER1 (hatched with lines sloping upward to the left in the figure) detected as described above. In this manner, the left edges EL1 are detected along portions of the range image corresponding to left edges of the deep-fried chicken pieces 291, and the right ledges ER1 are detected along portions of the range image corresponding to right edges of the deep-fried chicken pieces 291.

Figure 8A:
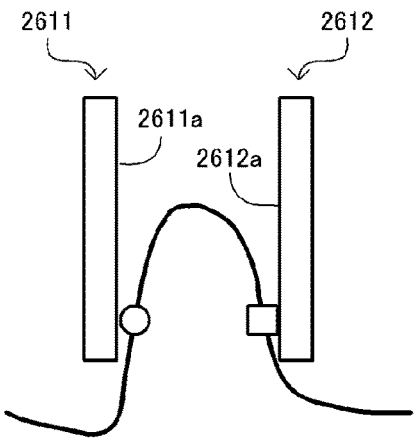
FIGS. 8A and 8B are diagrams describing a collision avoidance process.

In step S105, the candidate single-finger placement position detector 211 performs a collision avoidance process for the left edges in the range image. The collision avoidance process for the left edges will now be described with reference to FIGS. 8A and 8B. In the present embodiment, any collision with the left finger 2611 of the two-finger hand 261 placed on a left edge detected in step S104 is detected. The left finger 2611 may collide with an object such as another portion of the target object 29 including the edge, or with another target object 29 or the tray 28. As shown in FIG. 8A, the left finger 2611 is placed on the left of the target object 29 to grip the left edge. The collision avoidance process determines whether a measurement point cloud in the 3D measurement data is in the area of the left finger 2611. When a measurement point cloud is determined to be in the area, a collision is detected, and the position of the left finger 2611 is rejected. When no measurement point cloud is determined to be in the area, the position of the left finger 2611 is retained for later processes. The area of the left finger 2611 may be calculated based on the hand shape data obtained in step S101. In the collision avoidance process, the area of the left finger 2611 is represented by a cross section of the left finger 2611 moving parallel to x-axis and in the positive x-direction approaching the target object 29. When the left finger 2611 has a rectangular cross section having two sides parallel to x-axis and two sides parallel to y-axis, a right-side surface 2611a of the left finger 2611 (refer to FIG. 8A) facing the right finger 2612 is oriented to be parallel to y-axis. Similarly, in the collision avoidance process, the area of the right finger 2612 is represented by a cross section of the right finger 2612 moving parallel to x-axis and in the negative x-direction approaching the target object 29. When the right finger 2612 has a rectangular cross section having two sides parallel to x-axis and two sides parallel to y-axis, a left-side surface 2612a of the right finger 2612 (refer to FIG. 8A) facing the left finger 2611 is oriented to be parallel to y-axis.

Figure 8B:
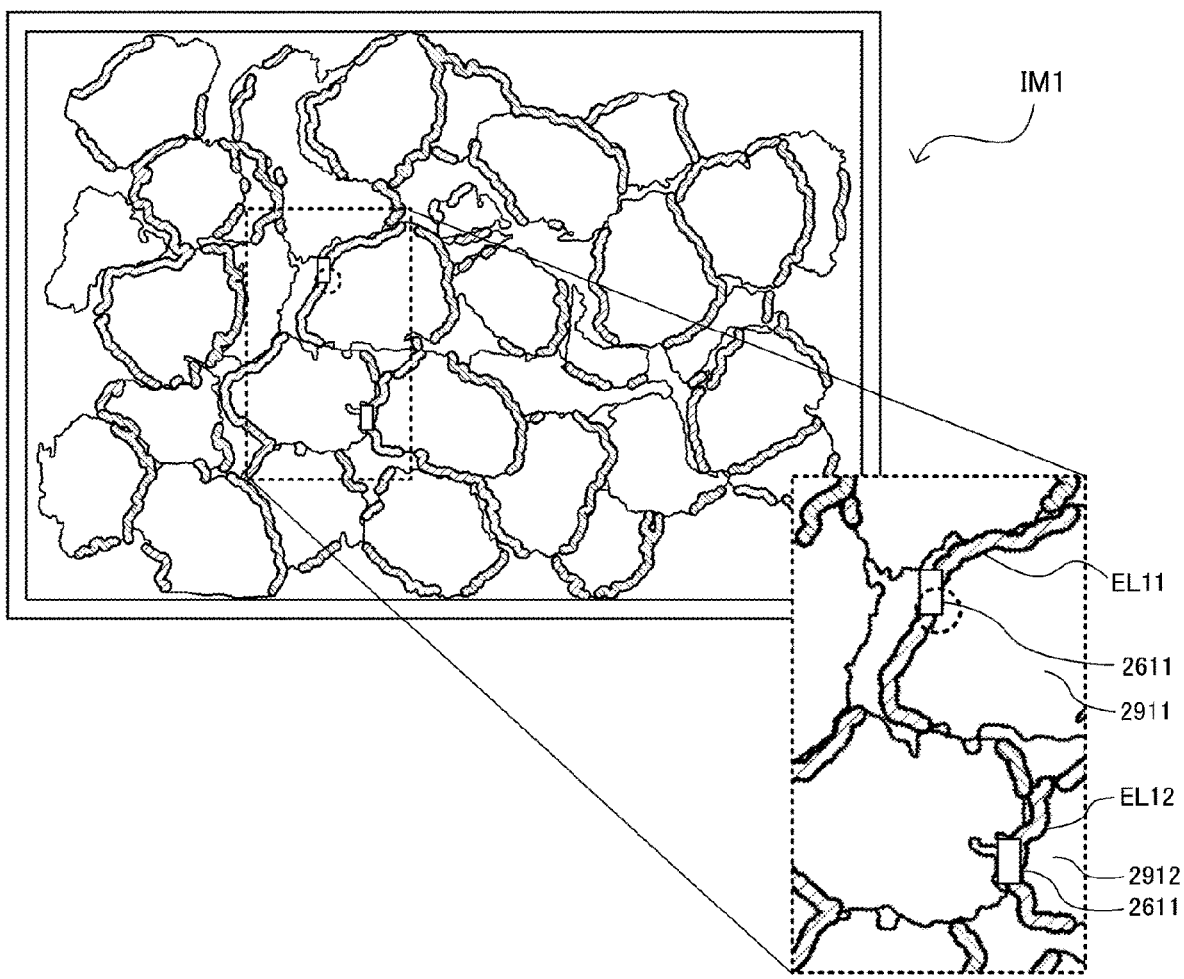

FIG. 8B is a partially enlarged view of the range image IM1 showing edges. For example, when the left finger 2611 is at the position on a left edge EL11 shown in FIG. 8B, the area of the left finger 2611 represented as the rectangular cross section collides with another portion of a target object 2911 including the left edge EL11 in the area indicated by a dashed circle. Thus, this position of the left finger 2611 is rejected. In contrast, when the left finger 2611 is at the position on a left edge EL12 shown in FIG. 8B, the area of the left finger 2611 represented as the rectangular cross section does not collide with any object such as another portion of a target object 2912 including the left edge EL12, or another target object. Thus, this position of the left finger 2611 is retained.

The collision avoidance process for the right finger 2612 is performed in the same manner as the collision avoidance process for the left finger 2611 described above. As shown in FIG. 8A, a collision with the right finger 2612 of the two-finger hand 261 placed on a detected right edge is detected. A position of the right finger 2612 causing a collision is then rejected, whereas a position of the right finger 2612 causing no collision is retained.

In step S106, the candidate single-finger placement position detector 211 detects right edges in the range image of the target objects 29 rotated by the angle kΔθ in step S103. The details of the detection method for right edges are the same as those for left edges and will not be described.

In step S107, the candidate single-finger placement position detector 211 performs a collision avoidance process for the right edges in the range image. The details of the collision avoidance process for right edges are the same as those for left edges and will not be described.

Multi-Finger Combination Search Process

In step S108, the multi-finger combination searcher 212 performs a multi-finger combination search process. An example multi-finger combination search process will be described with reference to the flowchart in FIG. 9. The multi-finger combination search process mainly registers, as a candidate, among combinations of a left edge and a right edge within a set finger opening width, a combination that satisfies a determination criterion to allow gripping.

In steps S801 and S811, the multi-finger combination searcher 212 repeats the processing in steps S802 to S809 for all values in y-axis within a target area.

In steps S802 and S810, the multi-finger combination searcher 212 repeats the processing in steps S803 to S809 for all left edges at the current y-coordinate.

In steps S803 and S809, the multi-finger combination searcher 212 repeats the processing in steps S804 to S807 for all right edges within the opening width defined with the current left edge.

In step S804, the multi-finger combination searcher 212 determines, for a left edge at the current y-coordinate, whether each of the right edges within the opening width satisfies a criterion for a holdable height. The opening width between the left finger 2611 and the right finger 2612 will now be described with reference to FIG. 10. The shape data about the two-finger hand 261 includes data about a minimum opening width and a maximum opening width between the left finger 2611 and the right finger 2612. As shown in FIG. 10, when the left finger 2611 is placed on the left edge EL11, the right finger 2612 can be placed between a position with a minimum opening width Wmin and a position with a maximum opening width Wmax, or within an opening width range Wrange. Thus, right edges ER11 and ER12 are located within the opening width range. Right edges located farther in the positive x-direction, or right edges located farther away from the left edge EL11 are determined not to be within the opening width range.

The holdable height criterion is used to determine whether a holdable height calculated from the range image exceeds a predetermined threshold. For each of a left edge and a right edge detected in the range image by the candidate single-finger placement position detector 211, an upper end and a lower end are determined. The distance, or a height, between either of the upper ends having a longer range and either of the lower ends having a shorter range can be recognized as a height at which the target object is holdable by the left finger and the right finger used in combination. This height is thus referred to as a holdable height. A larger holdable height defined as above allows the two-finger hand 261 to grip the target object 29 more easily. The upper end and the lower end of each edge can be determined by calculating a point at which the difference in the range is less than or equal to a predetermined value.

More specifically, in step S804, when the holdable height is less than a predetermined threshold, the multi-finger combination searcher 212 determines that the holdable height criterion is not satisfied and advances the processing to step S805 to reject the combination of the left edge and the right edge.

In step S804, when the holdable height is greater than or equal to the predetermined threshold, the multi-finger combination searcher 212 determines that the holdable height criterion is satisfied and advances the processing to step S806.

Figure 11A:
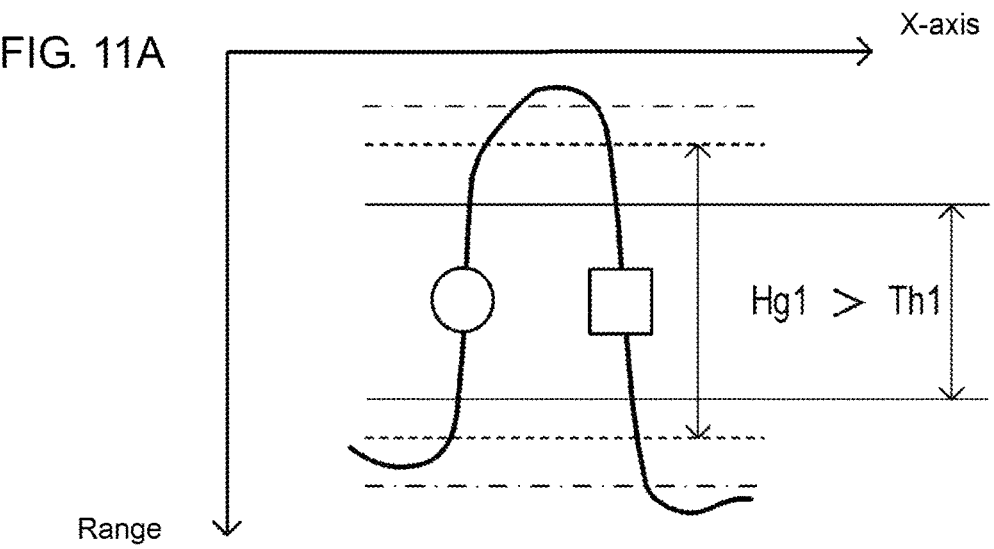
FIGS. 11A, 11B, and 11C are diagrams describing determination examples based on a holdable height criterion.
Figure 11B:
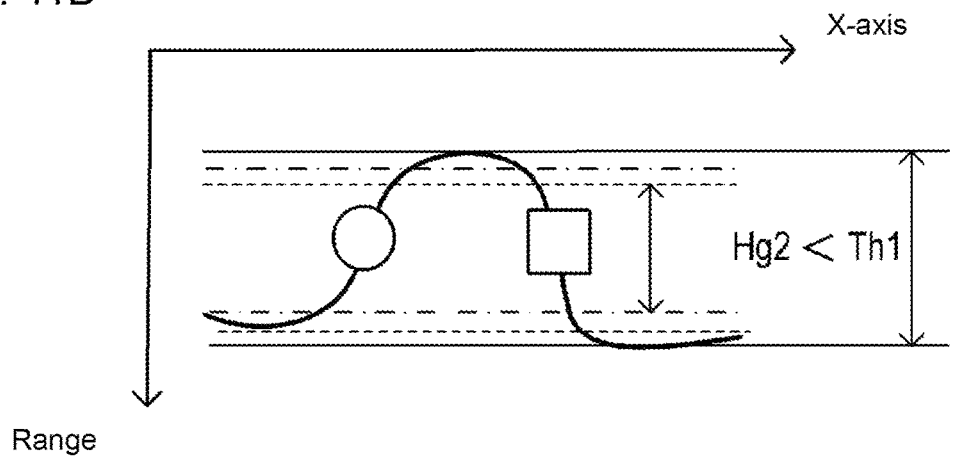
Figure 11C:
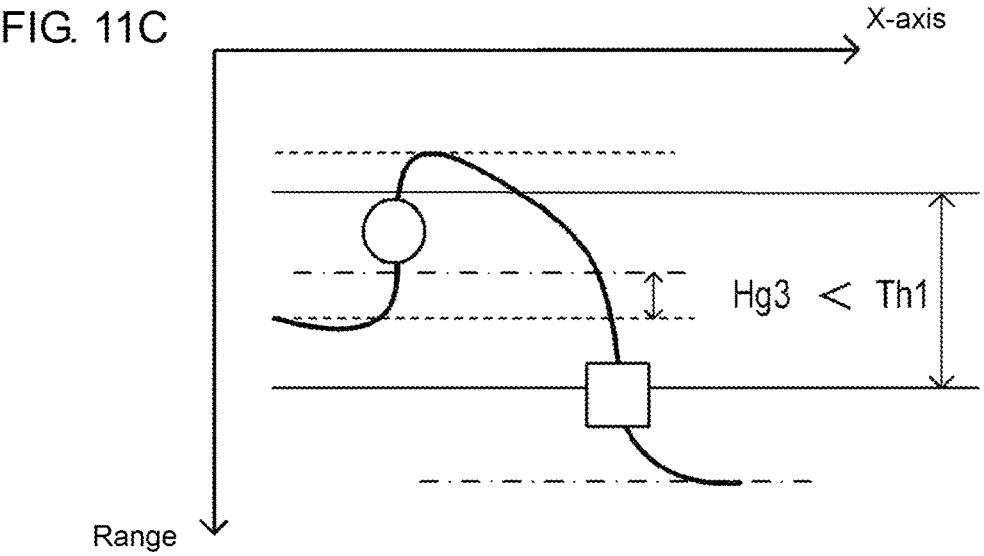

FIGS. 11A to 11C show determination examples based on the holdable height criterion. In the range image shown in FIG. 11A, a left edge is indicated by a circle, and a right edge is indicated by a square. The dashed lines indicate the upper end and the lower end of the left edge. The dot-and-dash lines indicate the upper end and the lower end of the right edge. In the range image shown in FIG. 11A, the upper end of the left edge has a longer range, and the lower end of the left edge has a shorter range. A distance Hg1 between the upper end and the lower end of the left edge is the holdable height. In this case, the holdable height Hg1 is greater than or equal to a threshold Th1 and is determined to satisfy the holdable height criterion. In the range image shown in FIG. 11B, the upper end of the left edge has a longer range, and the lower end of the right edge has a shorter range. A distance Hg2 between the upper end of the left edge and the lower end of the right edge is the holdable height. In this case, the holdable height is less than the threshold Th1 and is determined not to satisfy the holdable height criterion. In the range image shown in FIG. 11C, the upper end of the right edge has a longer range, and the lower end of the left edge has a shorter range. A distance Hg3 between the upper end of the right edge and the lower end of the left edge is the holdable height. Although the left edge and the right edge each have a long distance between the upper end and the lower end, the holdable height is small and less than the threshold Th1 and is determined not to satisfy the holdable height criterion.

In step S806, the multi-finger combination searcher 212 determines, for a left edge at the current y-coordinate, whether each of the right edges within the opening width satisfies a criterion for an inner recess height.

The inner recess height criterion is used to determine whether a height of a recess located between the holding portions calculated from the range image is less than or equal to a predetermined threshold. For a left edge and a right edge detected in a range image by the candidate single-finger placement position detector 211, the inner recess height is a height defined by either of the upper end of the left edge and the upper end of the right edge having a shorter range and a point between the upper end of the left edge and the upper end of the right edge having the longest range.

Figure 12:
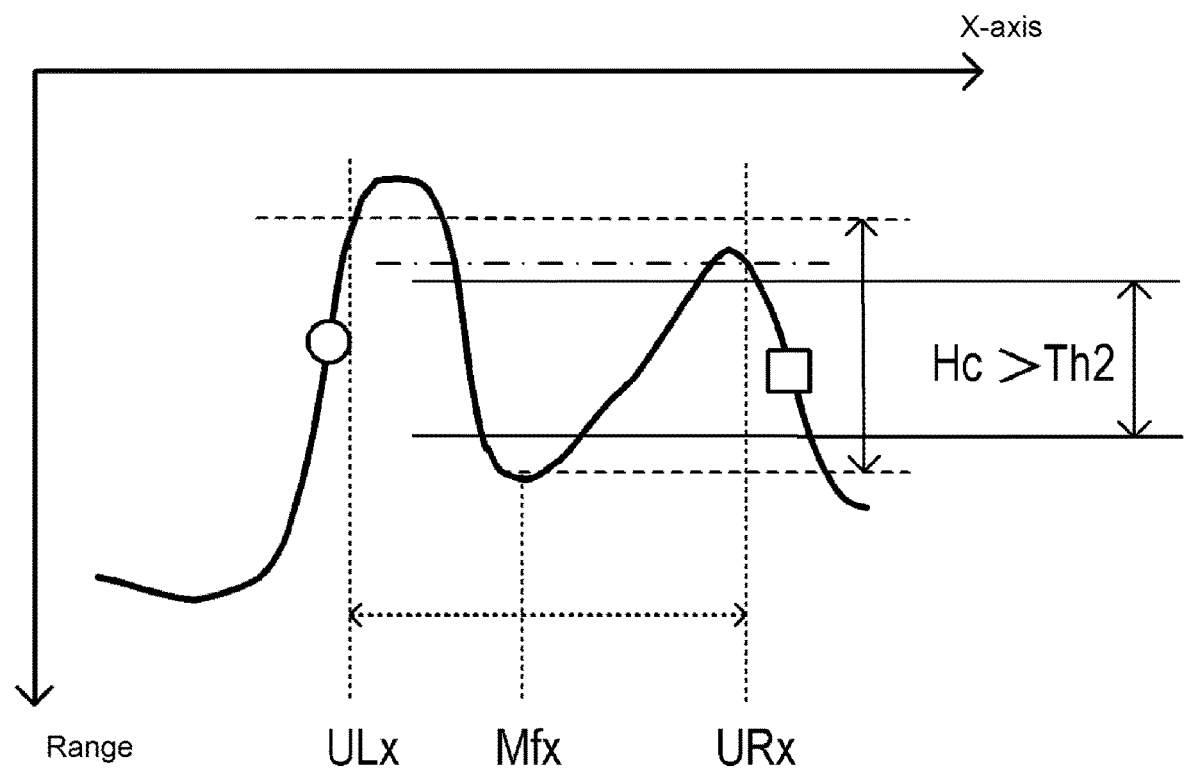
FIG. 12 is a schematic diagram describing an inner recess height.

FIG. 12 shows an example inner recess height. In the range image shown in FIG. 12, a left edge is indicated by a circle, and a right edge is indicated by a square. The dashed line indicates the upper end of the left edge, and the dot-and-dash line indicates the upper end of the right edge. The area between a position ULx of the upper end of the left edge in x-direction and a position URx of the upper end of the right edge in x-direction is indicated by a dotted arrow. In the area, the range is the longest at a position Mfx in x-direction. Thus, in this example, a height Hc defined by the upper end of the left edge and the point between the upper end of the left edge and the upper end of the right edge having the longest range is the inner recess height.

When the inner recess height is large, the left finger and the right finger may grip two or more target objects. However, a single target object is to be gripped in a reliable manner. Thus, in step S806, when the inner recess height is greater than a predetermined threshold, the multi-finger combination searcher 212 determines that the inner recess height criterion is not satisfied and advances the processing to step S805 to reject the combination of the left edge and the right edge. In the example shown in FIG. 12, the inner recess height Hc is greater than a predetermined threshold Th2 and is determined not to satisfy the inner recess height criterion.

When the inner recess height is less than or equal to the predetermined threshold in step S806, the multi-finger combination searcher 212 advances the processing to step S807 to register the combination of the left edge and the right edge as a current candidate combination.

As described above, the processing in steps S804 to S807 is performed for all the right edges within the opening width defined with the current left edge (step S809). The processing in steps S803 to S809 is then performed for all the left edges at the current y-coordinate (step S810). The processing in steps S802 to S810 is then performed for all values in y-axis within a target area (step S811). The multi-finger combination search process ends.

Figure 13:
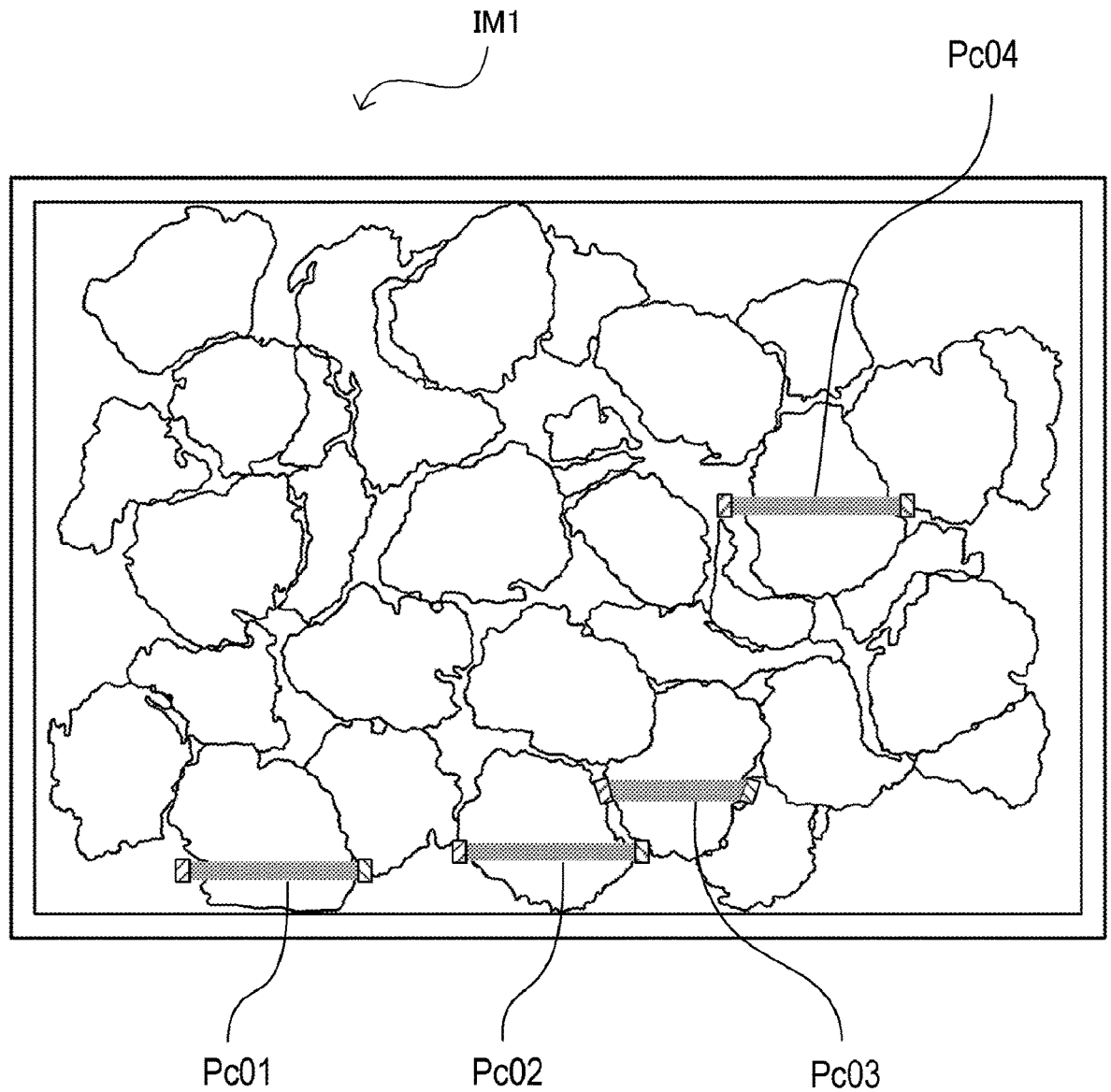
FIG. 13 is a diagram of a range image showing example candidate combinations of a left edge and a right edge.

FIG. 13 shows example candidate combinations of a left edge and a right edge registered in this manner for a range image with a rotation angle of 0 degrees. In the example, candidate combinations of a left edge and a right edge Pc01, Pc02, Pc03, and Pc04 are registered. Candidate combinations of a left edge and a right edge are also registered for range images with other rotation angles in the same manner.

Referring back to the flowchart in FIG. 3, the gripping position recognition process will be described further.

When the multi-finger combination search process in step S108 is complete, the multi-finger combination searcher 212 advances the processing to step S109 and determines whether k<N−1. As described above, N=12 when the rotation unit angle $\Delta\theta$ is set to 15 degrees.

When k<N−1 is determined in step S109, k+1 is substituted fork (step S110), and the processing in step S103 and subsequent steps is repeated.

When k<N−1 is determined not to hold in step S109, the processing advances to step S111.

In step S111, multi-finger search results for the range images with rotation angles from 0 to (N−1)$\Delta\theta$ in increments of $\Delta\theta$ are integrated, and candidate multi-finger combinations are prioritized.

Figure 14:
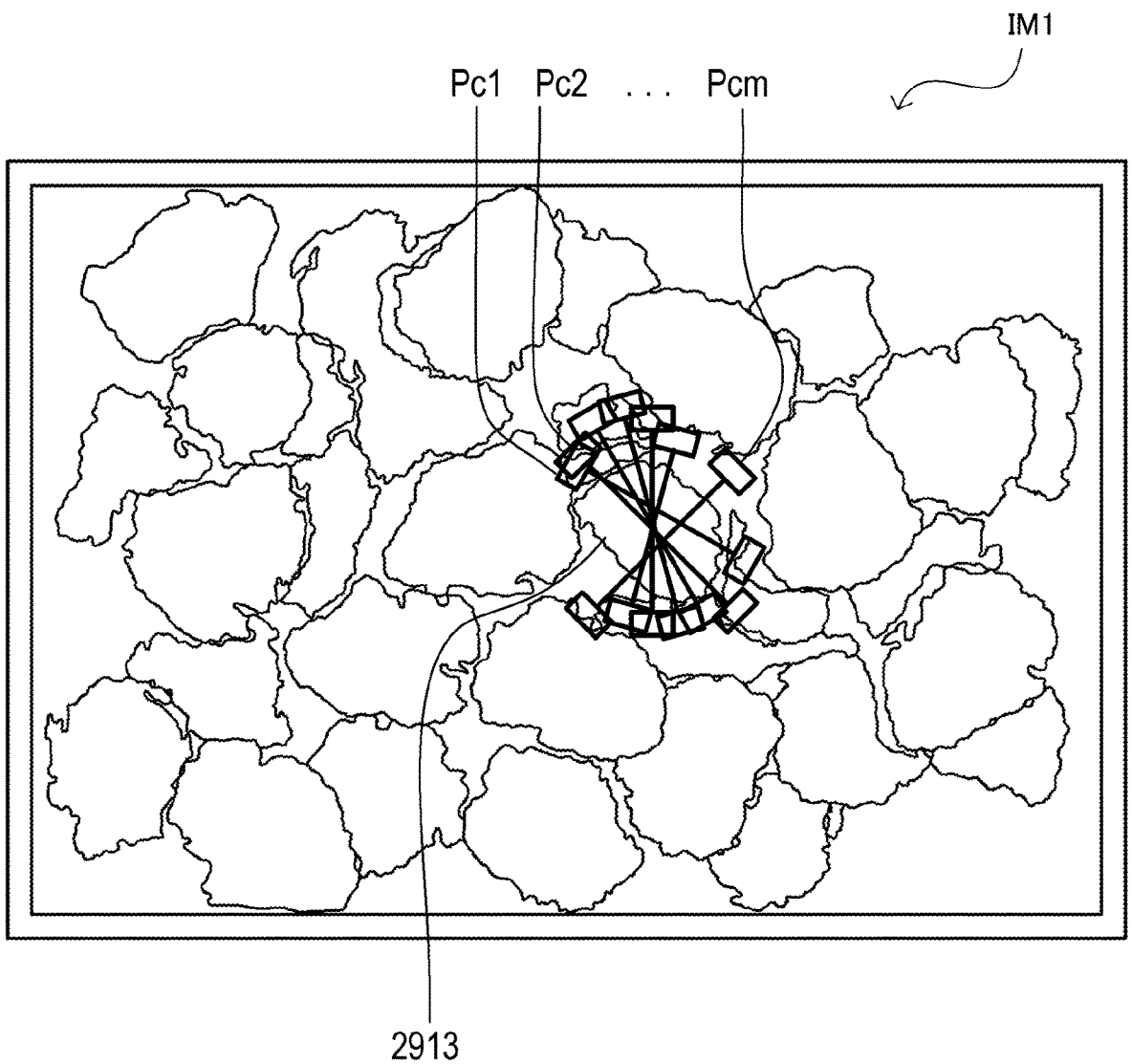
FIG. 14 is a diagram of a range image showing an example of integrated combination search results.

FIG. 14 shows example integrated combination search results. Multi-finger combinations Pc1, Pc2, ..., Pcm for a portion of the range image corresponding to a single target object 2913 included in the range image IM1 are integrated candidate multi-finger combinations registered for the range images with rotation angles from 0 to (N−1)$\Delta\theta$, or 0 to 165 degrees in increments of 15 degrees in this example. Although FIG. 14 shows integrated candidate multi-finger combinations for the portion of the range image corresponding to the single target object 2913, integrated candidate multi-finger combinations can also be obtained for portions of the range image corresponding to other target objects 291.

Figure 15A:
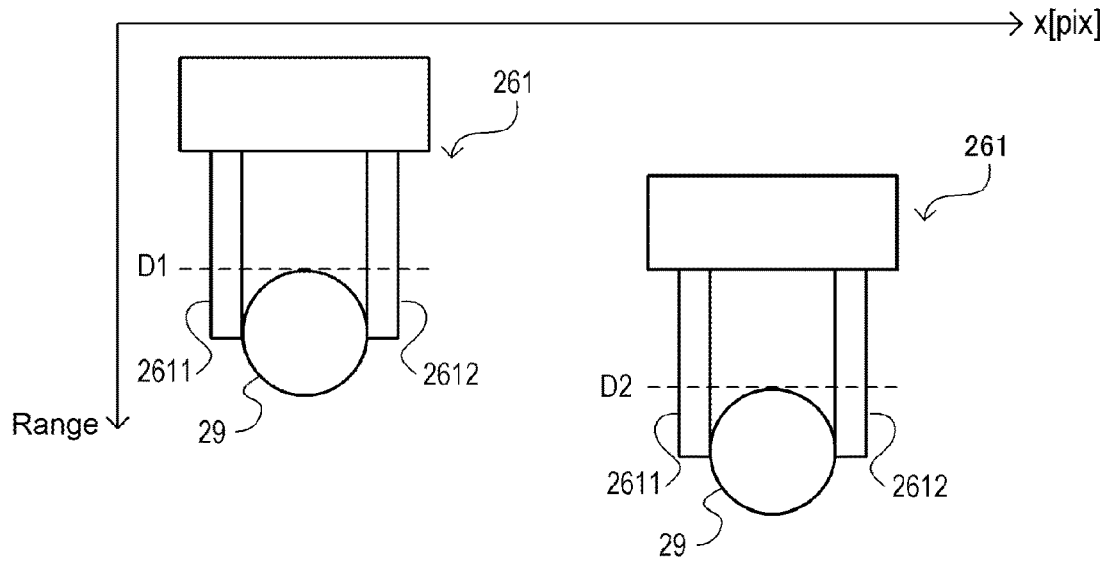
FIGS. 15A, 15B, and 15C each are a schematic diagram showing an example evaluation based on an evaluation index for prioritization.
Figure 15B:
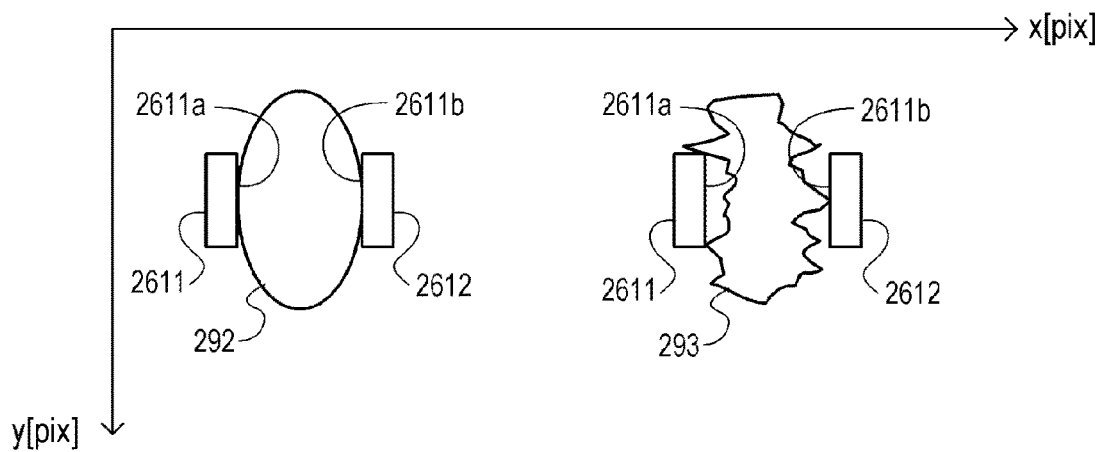
Figure 15C:
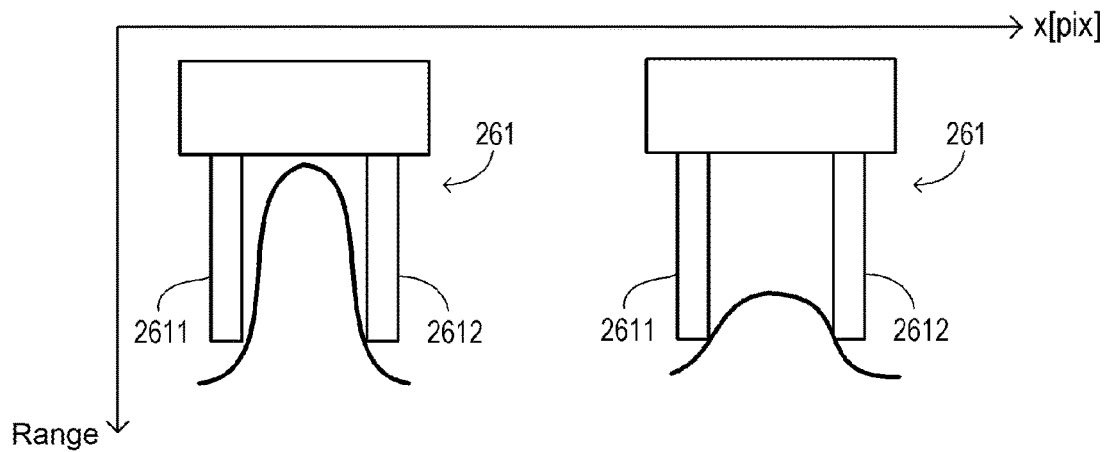

Multiple evaluation indices may be used for prioritizing integrated candidate multi-finger combinations. FIGS. 15A to 15C each show an example evaluation index. In FIG. 15A, the range to a target object 29 is used as an evaluation index. In the left part of FIG. 15A, the range to the target object 29 is D1. In the right part of FIG. 15A, D1<D2, where D2 is the range to the target object 29. A target object 29 with a shorter range is less likely to have portions being hidden and thus has a higher priority. In this example, the target object 29 with a shorter range in the left part of FIG. 15A has a higher priority than the target object 29 with a longer range in the right part of FIG. 15A.

In FIG. 15B, the straightness of the target object 29 is used as an evaluation index. A target object 29 having portions with a higher degree of straightness being in contact with the inner side surfaces 2611a and 2612a of the fingers 2611 and 2612 allows more stable gripping and thus has a higher priority. In this example, a target object 292 has portions with a higher degree of straightness being in contact with the inner side surfaces 2611a and 2612a of the fingers 2611 and 2612. A target object 293 has portions with a lower degree of straightness being in contact with the inner side surfaces 2611a and 2612a. Thus, the target object 292 in the left part of FIG. 15B has a higher priority than the target object 293 in the right part of FIG. 15B. As the straightness of a target object 29, the maximum value or the mean value of distances between the inner side surface of the finger and points on the edge of the target object 29 may be calculated. The straightness of the target object 29 may be calculated in any other manner.

In FIG. 15C, the holdable height is used as an evaluation index. The holdable height is the same as the height determined for combination searches. A target object with a larger holdable height allows more stable gripping and thus has a higher priority. A target object in the left part of FIG. 15C has a larger holdable height than a target object in the right part of FIG. 15C and thus has a higher priority than the target object in the right part of FIG. 15C.

As described above, the prioritization is performed using a combination of the three evaluation indices, or specifically the range to the target object 29, the straightness of portions of the target object 29 in contact with the inner side surfaces 2611a and 2612a of the fingers 2611 and 2612, and the holdable height. The multiple evaluation indices may be combined by calculating the weighted sum of the evaluation indices or totaling discrete evaluation results of the evaluation indices. A target object with a higher integrated evaluation index value combining the evaluation indices has a higher priority.

FIG. 16 shows prioritized candidate multi-finger combinations superimposed on the range image IM1. For a portion of the range image corresponding to a target object 2913, a candidate multi-finger combination Pr1 with a first priority, a candidate multi-finger combination Pr2 with a second priority, a candidate multi-finger combination Pr5 with a fifth priority, a candidate multi-finger combination Pr7 with a seventh priority, and a candidate multi-finger combination Pr8 with an eighth priority are registered. For a portion of the range image corresponding to a target object 2914, a candidate multi-finger combination Pr3 with a third priority and a candidate multi-finger combination Pr4 with a fourth priority are registered. For a portion of the range image corresponding to a target object 2915, a candidate multi-finger combination Pr6 with a sixth priority and a candidate multi-finger combination Pr9 with a ninth priority are registered. For a portion of the range image corresponding to a target object 2916, a candidate multi-finger combination Pr10 with a tenth priority is registered. Although the first ten candidate multi-finger combinations in the order of priority are shown in this example, candidate multi-finger combinations with lower priorities are also registered in the same manner.

In step S112, gripping poses prioritized in step S111 are output to the PLC 25. The PLC 25 controls the robot 27 and the multi-finger hand 26 in accordance with the prioritized gripping poses to grip a target object 29.

Second Embodiment

Figure 17:
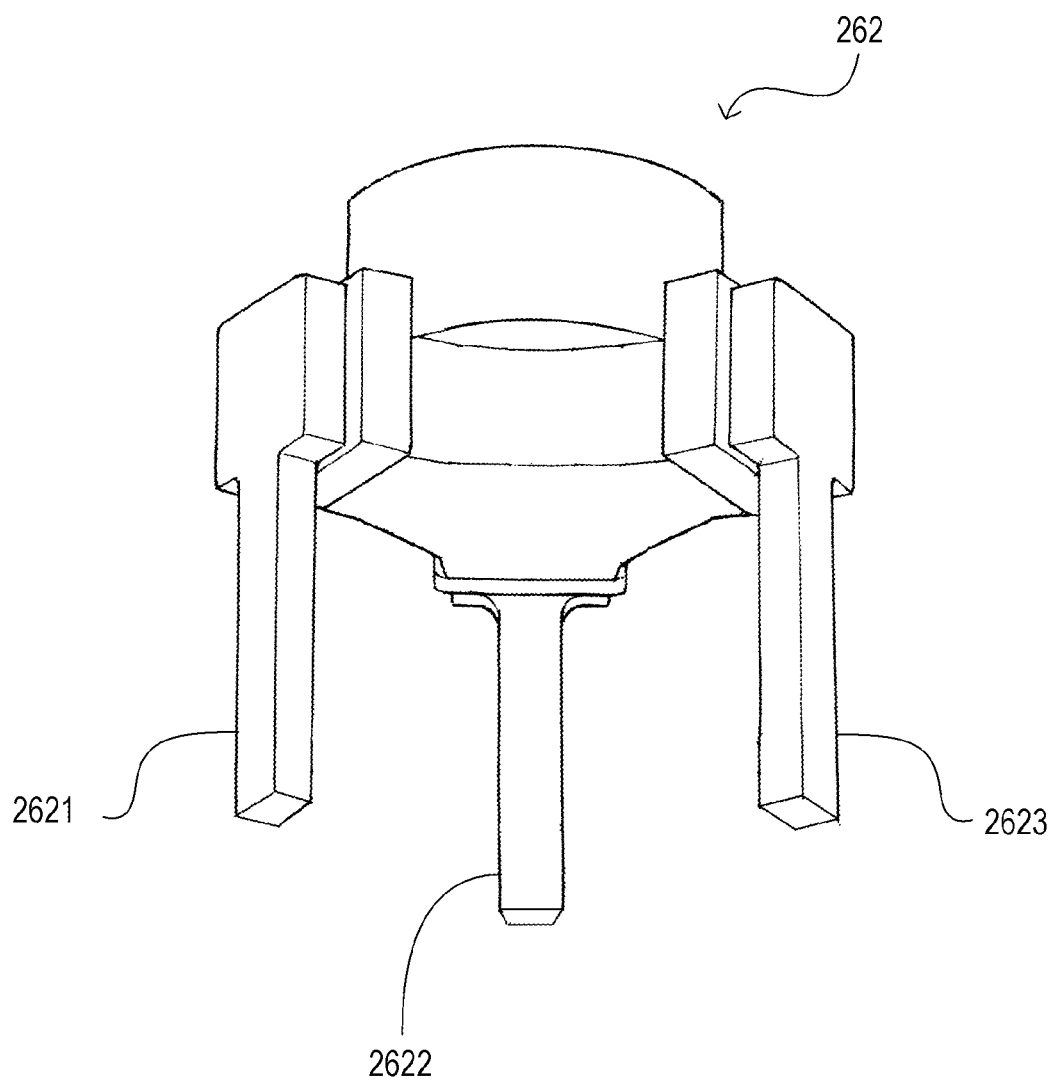
FIG. 17 is a schematic perspective view of a three-finger hand.

In the present embodiment, a three-finger hand 262 including three fingers 2621, 2622, and 2623 as shown in FIG. 17 is used as a multi-finger hand.

The three-finger hand 262 includes the three fingers 2621, 2622, and 2623 circumferentially spaced at intervals of 120 degrees from one another. The fingers 2621, 2622, and 2623 slide radially inward or radially outward, decreasing or increasing the space between them to grip a target object 29. The three-finger hand 262 may swing instead of sliding.

A gripping position recognition apparatus in a second embodiment has the same configuration as the gripping position recognition apparatus in the first embodiment except the structure of the multi-finger hand. The same components as those in the first embodiment are given the same reference numerals and will not be described in detail.

Figure 18:
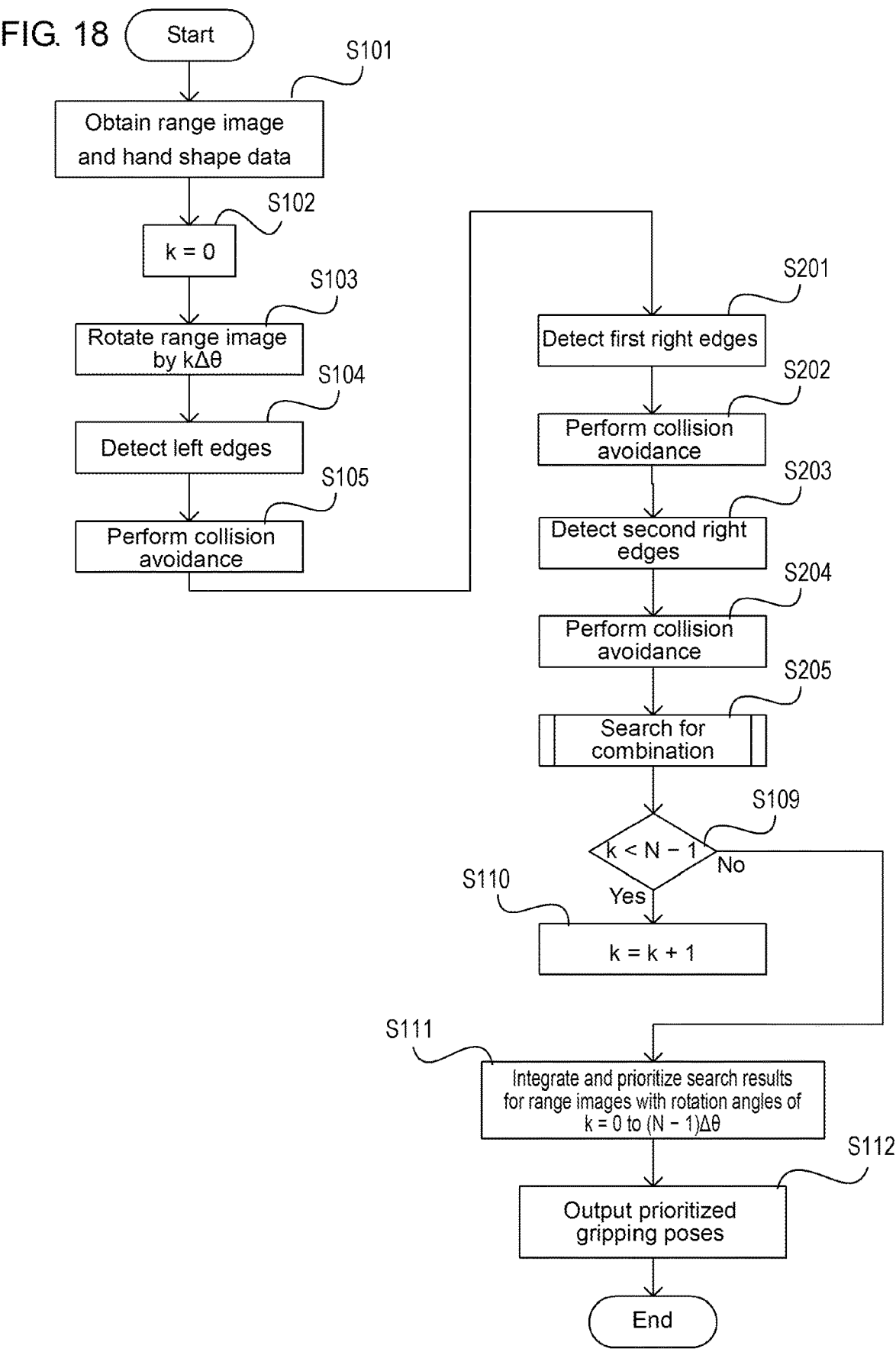
FIG. 18 is a flowchart showing a gripping position recognition process according to a second embodiment.

An example gripping position recognition process performed with the method of information processing performed by the information processor 21 will now be described with reference to the flowchart in FIG. 18.

The processing in steps S101 to S103 is the same as in the first embodiment and will not be described.

In step S104, left edges in the range image rotated by the angle $k\Delta\theta$ are detected. In step S105, a collision avoidance process is performed. The processing in the present embodiment is the same as the processing in the first embodiment. However, for the three-finger hand 262, left edge detection in the range image is performed differently and will now be described.

Figure 19:
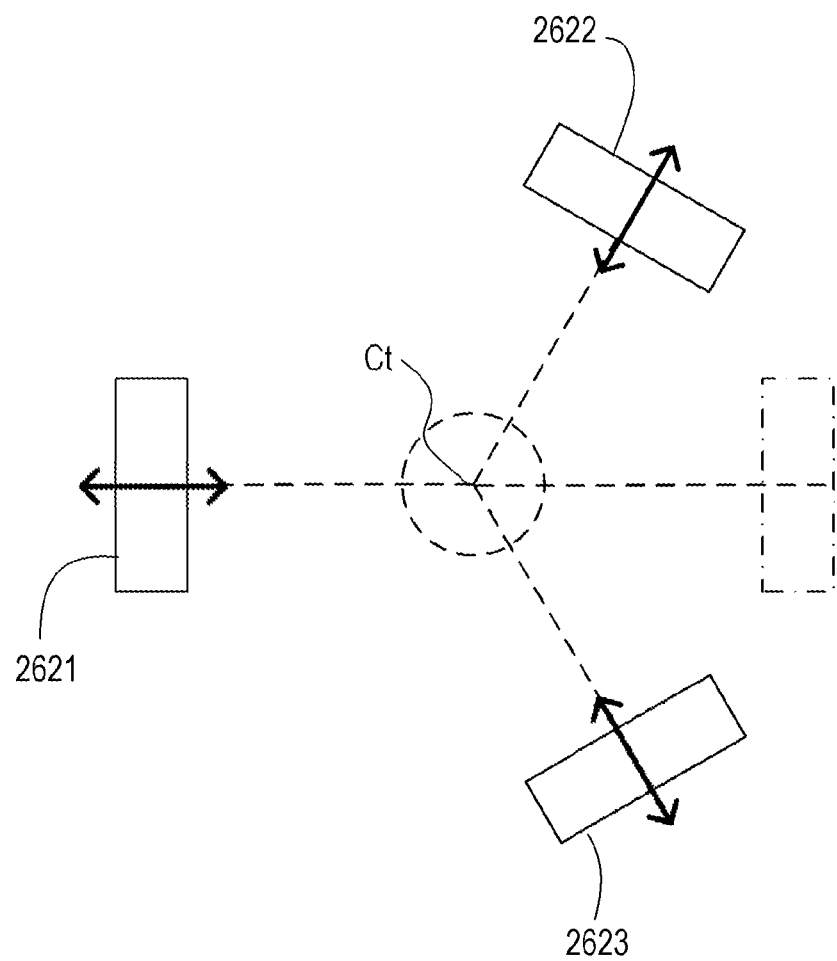
FIG. 19 is a diagram showing a positional relationship between the fingers of the three-finger hand.

FIG. 19 shows the fingers 2621, 2622, and 2623 of the three-finger hand 262 shown in FIG. 17 as viewed from their basal ends. As described above, with respect to a center Ct of the three fingers 2621, 2622, and 2623, the finger 2622 has a movable range rotated clockwise by 120 degrees from the movable range of the finger 2621, the finger 2623 has a movable range rotated counterclockwise by 120 degrees from the movable range of the finger 2621, and the finger 2623 has a movable range rotated clockwise by 120 degrees from the movable range of the finger 2622.

For the two-finger hand 261, a portion of the target object 29 to be gripped by the finger 2611 is detected as a left edge in the range image, and a portion of the target object 29 to be gripped by the finger 2612 is detected as a right edge in the same range image. The combinations of a left edge and a right edge are used for searching for combinations of candidate placement positions for the two fingers 2611 and 2612. For the three-finger hand 262, when a portion of the target object 29 to be gripped by the finger 2621 is detected as a left edge in the range image, neither of the other fingers is movable in a direction parallel to x-axis with respect to the y-coordinate of the detected left edge in the same range image. As shown in FIG. 19, the finger 2622 has a movable range rotated clockwise by 120 degrees from the movable range of the finger 2621. To detect a portion of the target object 29 to be gripped by the finger 2622 as a right edge by searching the range image in the negative x-direction with respect to a constant y-coordinate as with the two-finger hand, the range image used for detecting the left edge is rotated clockwise by 60 degrees. A right edge is then detected in the same range image. Similarly, to detect a portion of the target object 29 to be gripped by the finger 2623 as a right edge by searching the range image in the negative x-direction with respect to a constant y-coordinate, the range image used for detecting the left edge is rotated counterclockwise by 60 degrees. A right edge is then detected in the same range image.

In subsequent step S201, right edges (first right edges) are detected in the range image rotated clockwise by 60 degrees after being obtained in step S103. The right edges are detected with the same method as in step S106 in the first embodiment except that the range image rotated clockwise by 60 degrees is used. The method will not be described in detail.

Figure 20:
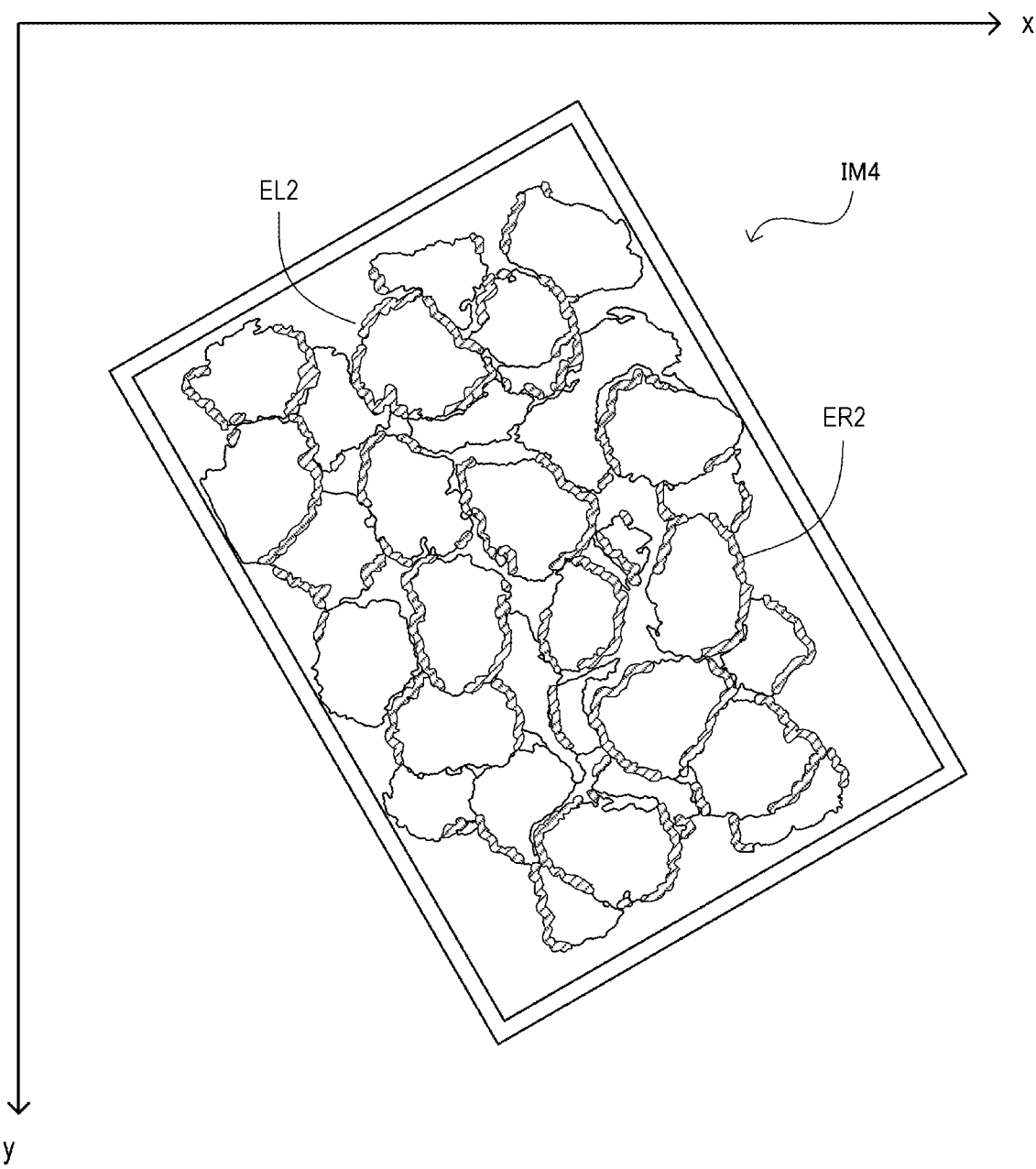
FIG. 20 is a diagram of a range image rotated clockwise by 60 degrees showing left edges and right ledges.

FIG. 20 is a diagram of a range image IM4 obtained by rotating the range image shown in FIG. 5A clockwise by 60 degrees, schematically showing left edges EL2 (hatched with lines sloping upward to the right in the figure) and right edges ER2 (hatched with lines sloping upward to the left in the figure) as in FIG. 7. In this manner, the right ledges ER2 are detected along portions of the range image corresponding to right edges of deep-fried chicken pieces 291.

In step S202, the collision avoidance process is performed for the right edges detected in step S201. The collision avoidance process for the right edges is the same as in step S107 in the first embodiment and will not be described in detail.

In step S203, right edges (second right edges) are detected in the range image rotated counterclockwise by 60 degrees after being obtained in step S103. The right edges are detected with same method as in step S106 in the first embodiment except that the range image rotated counterclockwise by 60 degrees is used. The method will not be described in detail.

Figure 21:
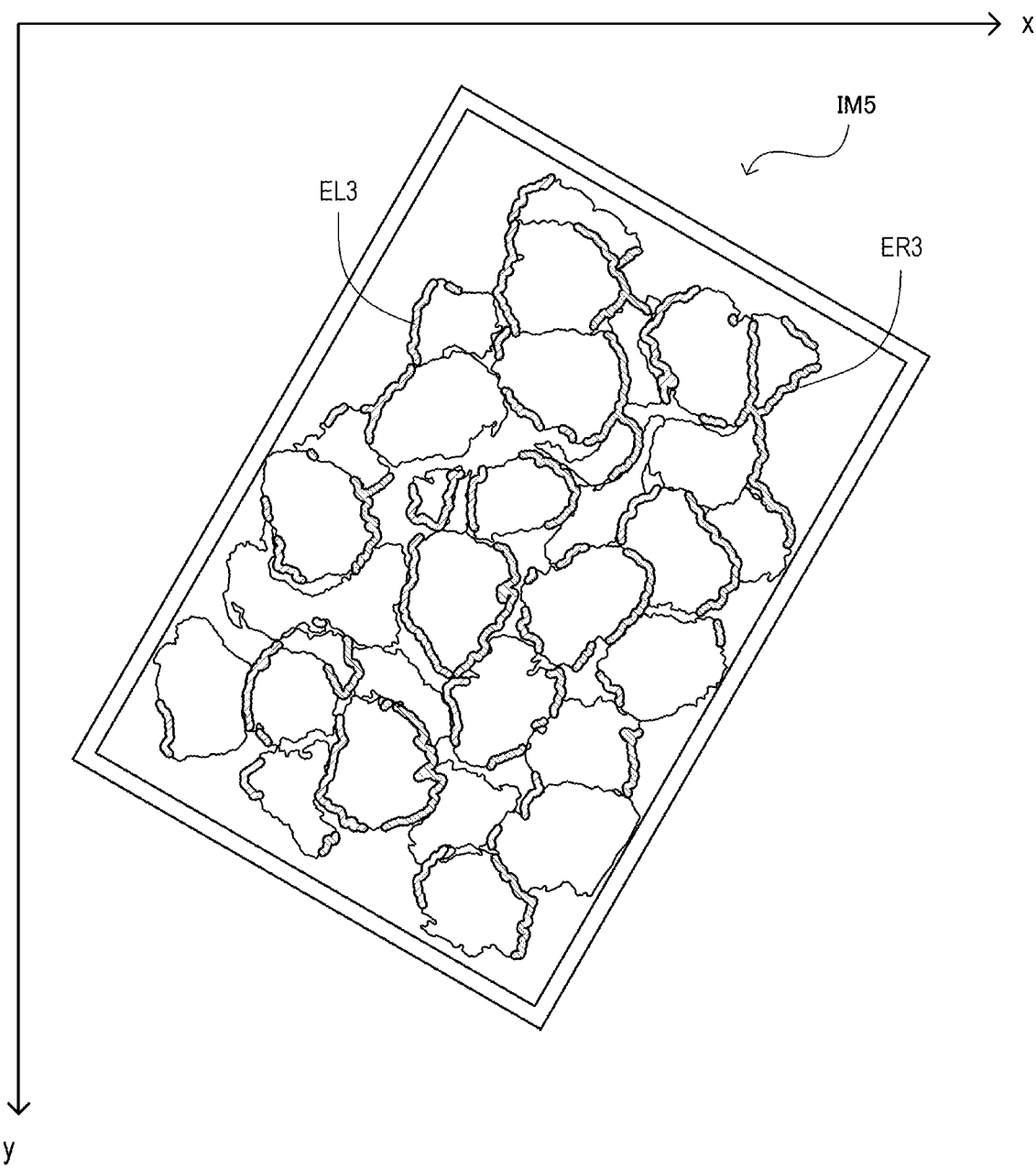
FIG. 21 is a diagram of a range image rotated counterclockwise by 60 degrees showing left edges and right ledges.

FIG. 21 is a diagram of a range image IM5 obtained by rotating the range image shown in FIG. 5A counterclockwise by 60 degrees, schematically showing left edges EL3 (hatched with lines sloping upward to the right in the figure) and right edges ER3 (hatched with lines sloping upward to the left in the figure) as in FIG. 7. In this manner, the right ledges ER3 are detected along portions of the range image corresponding to right edges of deep-fried chicken pieces 291.

In step S204, the collision avoidance process is performed for the right edges detected in step S203. The collision avoidance process for the right edges is the same as in step S107 in the first embodiment and will not be described in detail.

Multi-Finger Combination Search Process

Figure 9:
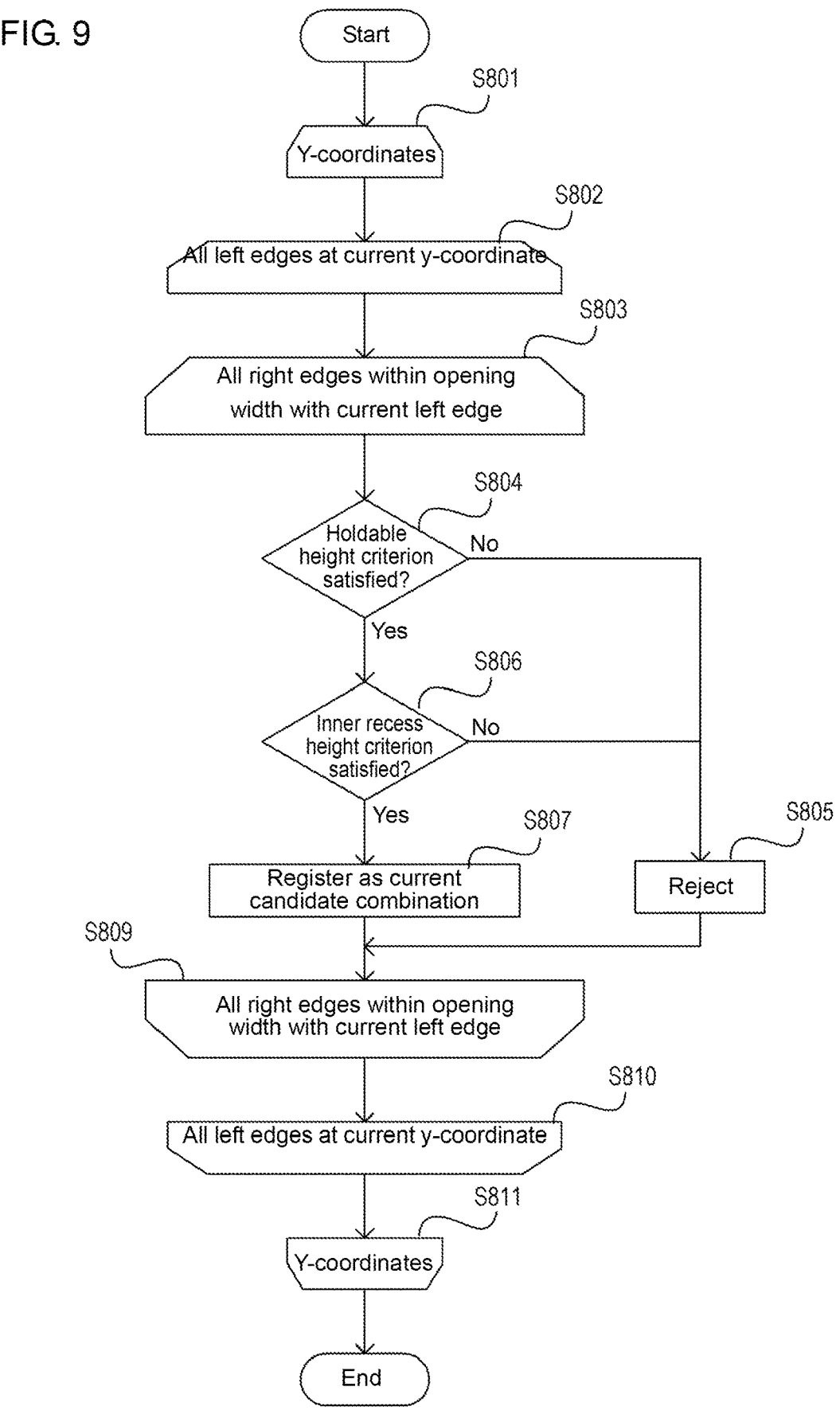
FIG. 9 is a flowchart showing a multi-finger combination search process according to the first embodiment.
Figure 22:
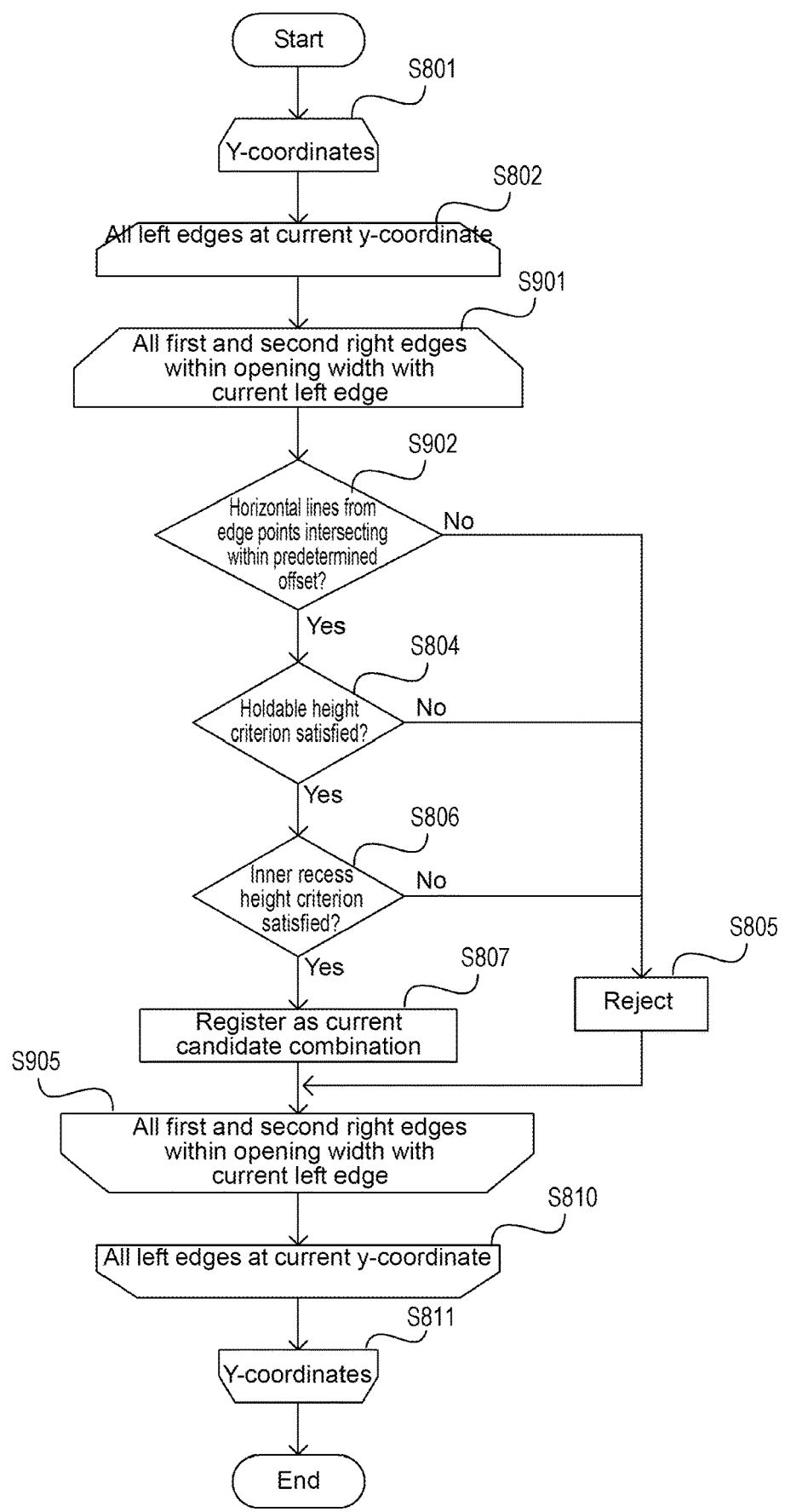
FIG. 22 is a flowchart showing a multi-finger combination search process according to the second embodiment.

In step S205, the multi-finger combination searcher 212 performs a multi-finger combination search process. An example multi-finger combination search process will be described with reference to the flowchart in FIG. 22. The same steps as in the multi-finger combination search process in the first embodiment shown in FIG. 9 are given the same reference numerals and will not be described in detail.

The processing in steps S801 and S802 is the same as in the first embodiment and will not be described.

In steps S901 and S905, the processing in steps S902 and S804 to S807 is repeated for all first right edges and second right edges within the opening width defined with the current left edge. The opening width is the same as in the first embodiment except that the three-finger hand 262 has two opening widths between the finger 2621 and the finger 2622 and between the finger 2621 and the finger 2623.

Figure 23:
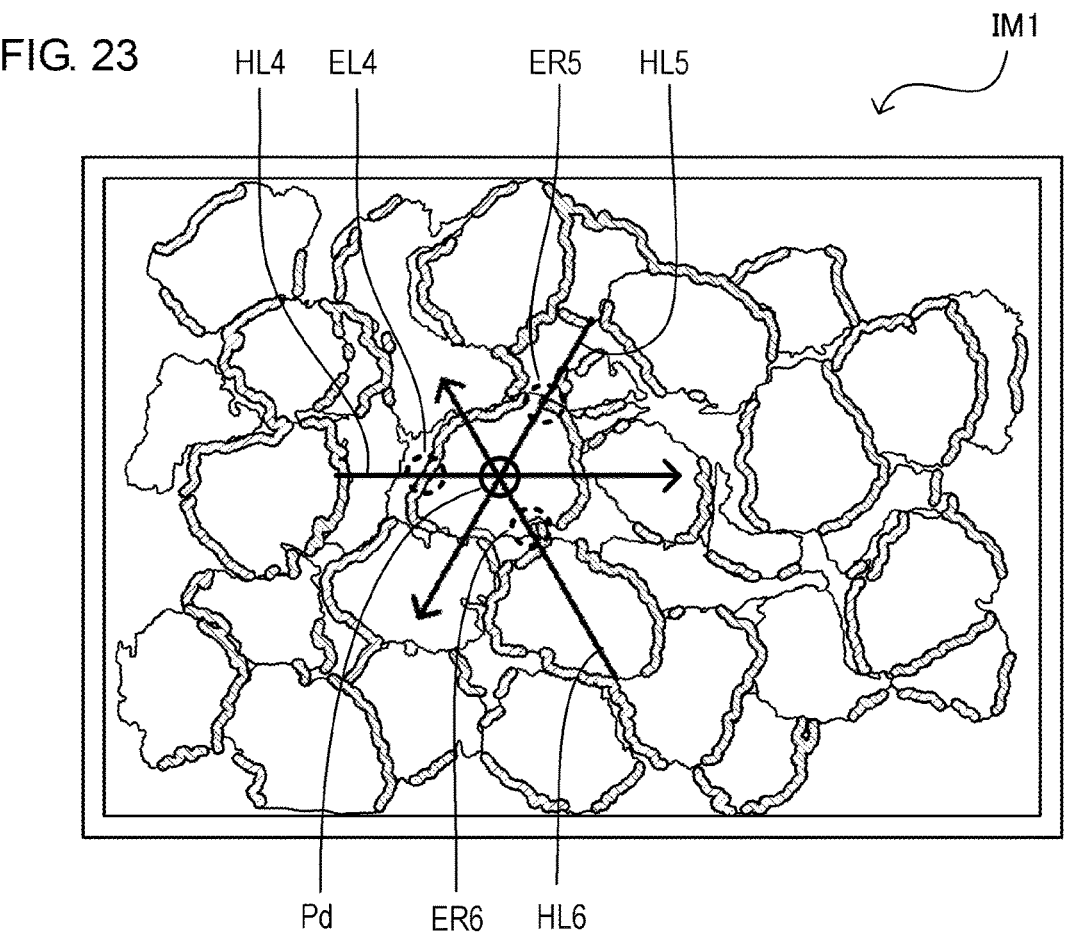
FIG. 23 is a diagram describing an example multi-finger combination search.

In step S902, the determination is performed as to whether, for a first right edge and a second right edge within the opening width defined with the left edge, horizontal lines extending from a point (edge point) included in each edge intersect with one another with a predetermined offset or less between them. FIG. 23 is a diagram schematically showing, in the range image IM1 horizontal lines extending from the edge points intersecting with one another with a predetermined offset or less between them. A horizontal line HL4 extends from a left edge point EL4. A horizontal line HL5 extends from a first right edge point ER5. The horizontal line HL5 passing through the first right edge point ER5 corresponds to a line extending in x-direction in the range image IM4 shown in FIG. 20 obtained by rotating the range image IM1 clockwise by 60 degrees. Thus, the horizontal line HL5 extends in a direction rotated counterclockwise by 60 degrees from x-direction in the range image IM1. A horizontal line HL6 extends from a second right edge point ER6. Similarly, the horizontal line HL6 passing through the second right edge point ER6 corresponds to a line extending in x-direction in the range image IM5 shown in FIG. 21 obtained by rotating the range image IM1 counterclockwise by 60 degrees. Thus, the horizontal line HL6 extends in a direction rotated clockwise by 60 degrees from x-direction in the range image IM1. In the example of FIG. 23, the horizontal lines HL4, HL5, and HL6 extending from the edge points EL4, ER5, and ER6 intersect with one another inside a circle Pd with a radius corresponding to a predetermined offset.

When the determination result is affirmative (Yes) in step S902, the processing advances to step S804.

When the determination result is negative (No) in step S902, the processing advances to step S805 to reject the combination of the left edge, the first right edge, and the second right edge.

The processing in steps S804 and S806 is the same as in the first embodiment and will not be described in detail. For the three-finger hand 262, the holdable height criterion and the inner recess height criterion can be determined for each of the three fingers with respect to each of the other two fingers. The criteria may be satisfied for all the three combinations of two fingers, or for at least one or two combinations of the fingers.

When the inner recess height criterion is determined to be satisfied in step S806, the processing advances to step S807 to register the left edge, the first right edge, and the second right edge as a candidate combination.

As described above, the processing in steps S902, and S804 to S807 is repeated for all first right edges and second right edges being within the opening width defined with the current left edge.

Subsequently, the processing in steps S901 to S905 is repeated for all the left edges at the current y-coordinate.

After the processing in steps S802 to S811 is repeated for all y-coordinates, the multi-finger combination search process ends, and the processing advances to step S109.

The processing in steps S109 to S112 is the same as in the first embodiment and will not be described in detail. In the present embodiment, in step S104, left edges are detected in a range image rotated by the angle $k\Delta\theta$ in step S103. In step S201, first right edges are detected in the range image rotated clockwise by 60 degrees. In step S203, second right edges are detected in the range image rotated counterclockwise by 60 degrees.

In the present embodiment, similarly to the first embodiment, when the unit angle $\Delta\theta$ is set to 15 degrees, 120 degrees divided by 15 degrees equals 8, and thus N is set to 8. The value of k is increased from 0 to 8 in increments of 1 to detect single-finger placement positions in range images with rotation angles increased from 0 to 105 degrees in increments of 15 degrees. The three-finger hand 262 has the three fingers 2621, 2622, and 2623 facing one another at an angle of 120 degrees relative to one another. While facing one another at an angle of 120 degrees, the three fingers 2621, 2622, and 2623 move to have the distance between them increased or decreased to grip a target object. Thus, a range image rotated at 120 degrees or more is equivalent to its corresponding range image with each of the three fingers 2621, 2622, and 2623 replaced by its adjacent finger. The processing may be eliminated for such a range image.

The present embodiment describes the three-finger hand 262. Prioritized gripping poses can also be calculated in the same manner for a multi-finger hand with four or more fingers. For the three-finger hand 262, left edges, first right edges, and second right edges are detected to search for multi-finger combinations. Other combinations of a left edge or a right edge from those described above may be detected. A target range image is rotated to have each finger moving in x-direction to grip a left edge or a right edge of a target object in accordance with the arrangement of the fingers included in the multi-finger hand. A left edge or a right edge is detected in the rotated range image. Among horizontal lines passing through points included in the left edges or right edges detected in the manner described above (lines in x-direction in rotated range images), lines intersecting one another with a predetermined offset or less between them in the target range image are detected. Then, combinations of edges that satisfy criteria including the holdable height criterion are registered as candidate multi-finger combinations and prioritized based on a predetermined evaluation index. In this manner, prioritized gripping poses can also be calculated for a multi-finger hand with four or more fingers.

The elements in the aspects of the present invention below are identified with reference numerals used in the drawings to show the correspondence between these elements and the components in the embodiments.

Aspect 1

An information processor (21) for calculating, for a robot hand (261) including a plurality of fingers (2611, 2612), a gripping pose at which the robot hand (261) grips a target object (29), the information processor (21) comprising:
  a candidate single-finger placement position detector (211) configured to detect, based on three-dimensional measurement data obtained through three-dimensional measurement of the target object (29) and hand shape data about a shape of the robot hand (261), candidate placement positions for each of the plurality of fingers (2611, 2612) of the robot hand (261);
  a multi-finger combination searcher (212) configured to search for, among the candidate placement positions for each of the plurality of fingers (2611, 2612), a combination of candidate placement positions to allow gripping of the target object (29); and
  a gripping pose calculator (213) configured to calculate, based on the combination of candidate placement positions for each of the plurality of fingers (2611, 2612), a gripping pose at which the robot hand (261) grips the target object (29).

REFERENCE SIGNS LIST 21 information processor
29 target object
211 candidate single-finger placement position detector
212 multi-finger combination searcher
213 optimum gripping pose calculator
261, 262 robot hand
2611, 2612, 2621, 2622, 2623 finger

The invention claimed is:

1. An information processor for calculating, for a robot hand including a plurality of fingers, a gripping pose at which the robot hand grips a target object, the information processor comprising:
  a candidate single-finger placement position detector configured to detect, based on three-dimensional measurement data obtained through three-dimensional measurement of the target object and hand shape data about a shape of the robot hand, candidate placement positions for each of the plurality of fingers of the robot hand;
  a multi-finger combination searcher configured to search for, among the candidate placement positions for each of the plurality of fingers, a combination of candidate placement positions to allow gripping of the target object; and
  a gripping pose calculator configured to calculate, based on the combination of candidate placement positions for each of the plurality of fingers, a gripping pose at which the robot hand grips the target object,
  wherein the information processor is configured to output the calculated gripping pose to a controller controlling the robot hand.

2. The information processor according to claim 1, wherein
  the candidate single-finger placement position detector further detects, based on three-dimensional measurement data about the target object obtained at an angle changed relative to the plurality of fingers for which candidate placement positions are to be detected, candidate placement positions for each of the plurality of fingers of the robot hand.

3. The information processor according to claim 1, wherein
  the candidate single-finger placement position detector detects an edge in a depth direction of a range image represented by the three-dimensional measurement data and detects, based on the detected edge, candidate placement positions for each of the plurality of fingers.

4. The information processor according to claim 3, wherein
  the candidate single-finger placement position detector detects, based on the hand shape data, candidate placement positions for each of the plurality of fingers to avoid collision at a position of the edge.

5. The information processor according to claim 3, wherein
  the multi-finger combination searcher calculates, for the combination of candidate placement positions for each of the plurality of fingers, a holdable height indicating an overlap, in the depth direction, between edges corresponding to the candidate placement positions for each of the plurality of fingers, and searches for, based on the holdable height, a combination of candidate placement positions for each of the plurality of fingers.

6. The information processor according to claim 3, wherein
  the multi-finger combination searcher calculates, for the combination of candidate placement positions for each of the plurality of fingers, an inner recess height indicating a recess between edges corresponding to the candidate placement positions for each of the plurality of fingers, and searches for, based on the inner recess height, a combination of candidate placement positions for each of the plurality of fingers.

7. An information processing method for calculating, for a robot hand including a plurality of fingers, a gripping pose at which the robot hand grips a target object, the method comprising:
  detecting, based on three-dimensional measurement data obtained through three-dimensional measurement of the target object and hand shape data about a shape of the robot hand, candidate placement positions for each of the plurality of fingers of the robot hand;

searching for, among the candidate placement positions for each of the plurality of fingers, a combination of candidate placement positions to allow gripping of the target object;

calculating, based on the combination of candidate placement positions for each of the plurality of fingers, a gripping pose at which the robot hand grips the target object; and outputting the calculated gripping pose to a controller controlling the robot hand.

8. A non-transitory computer readable medium storing a program for causing a computer to perform operations included in the information processing method according to claim 7.

* * * * *